US012615611B2

(12) United States Patent
Vassilovski et al.

(10) Patent No.: US 12,615,611 B2
(45) Date of Patent: Apr. 28, 2026

(54) DYNAMIC RELIABILITY DISTANCE FOR WIRELESS COMMUNICATIONS

(71) Applicant: QUALCOMM Incorporated, San Diego, CA (US)

(72) Inventors: Dan Vassilovski, Del Mar, CA (US); Tien Viet Nguyen, Bridgewater, NJ (US); Shuanshuan Wu, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 300 days.

(21) Appl. No.: 18/460,423

(22) Filed: Sep. 1, 2023

(65) Prior Publication Data

US 2025/0081147 A1 Mar. 6, 2025

(51) Int. Cl.
*H04W 64/00* (2009.01)
*H04W 4/12* (2009.01)
*H04W 92/18* (2009.01)

(52) U.S. Cl.
CPC ............. *H04W 64/00* (2013.01); *H04W 4/12* (2013.01); *H04W 92/18* (2013.01)

(58) Field of Classification Search
CPC ........ H04W 64/00; H04W 4/12; H04W 92/18
See application file for complete search history.

(56) References Cited

U.S. PATENT DOCUMENTS

| | | | | |
|---|---|---|---|---|
| 11,055,991 | B1 * | 7/2021 | Mulligan | ............... G08G 1/091 |
| 2012/0146814 | A1 * | 6/2012 | Kim | ................ G08G 1/096783 |
| | | | | 340/929 |

| | | | | |
|---|---|---|---|---|
| 2020/0026290 | A1 * | 1/2020 | Lim | ...................... G05D 1/0022 |
| 2020/0118445 | A1 * | 4/2020 | Kim | ......................... H04W 4/46 |
| 2020/0193813 | A1 * | 6/2020 | Sui | ......................... G08G 1/0116 |
| 2020/0267512 | A1 * | 8/2020 | Pfadler | ................. H04W 88/08 |
| 2020/0365033 | A1 * | 11/2020 | Cheng | .................. G08G 1/0145 |
| 2021/0183244 | A1 * | 6/2021 | Malhan | ..................... G06T 1/20 |
| 2021/0233396 | A1 * | 7/2021 | Guo | ..................... G08G 1/0133 |
| 2022/0007403 | A1 * | 1/2022 | Li | .......................... H04W 72/20 |
| 2022/0116820 | A1 * | 4/2022 | Avedisov | ................. H04Q 9/00 |
| 2022/0225243 | A1 * | 7/2022 | Claeson | .............. H04W 52/327 |
| 2023/0179958 | A1 * | 6/2023 | Chen | ..................... H04W 64/00 |
| | | | | 370/329 |
| 2023/0368670 | A1 * | 11/2023 | Balasubramanian | ......................... |
| | | | | G08G 1/0112 |
| 2023/0413026 | A1 * | 12/2023 | Khosla | ................... G08G 1/164 |

(Continued)

OTHER PUBLICATIONS

International Search Report and Written Opinion—PCT/US2024/043596—ISA/EPO—Nov. 29, 2024.

*Primary Examiner* — Abdelnabi O Musa

(74) *Attorney, Agent, or Firm* — QUALCOMM Incorporated

(57) ABSTRACT

Methods, systems, and devices for wireless communications are described. A vehicle user equipment (VUE) may generate a groupcast message for transmission in a vehicle to everything (V2X) system. The VUE may transmit the groupcast message using a transmit power that is based on a reliability distance that corresponds to a region for providing feedback for the groupcast message, where the reliability distance is based on one or more positioning parameters of the VUE and one or more environmental parameters associated with the V2X system. The VUE may then monitor for feedback for the groupcast message.

30 Claims, 16 Drawing Sheets

(56)          References Cited

U.S. PATENT DOCUMENTS

2024/0179664 A1* 5/2024 Wu ........................ H04W 4/023
2024/0248195 A1* 7/2024 Narula .................... H04W 4/40

* cited by examiner

710

720

715

705

700

130

105

115

Network
Entity

Transceiver

1410

Antenna

1415

Communications
Manager

1420

Memory

Code

1430

1425

1440

Processor

1435

1405

1400

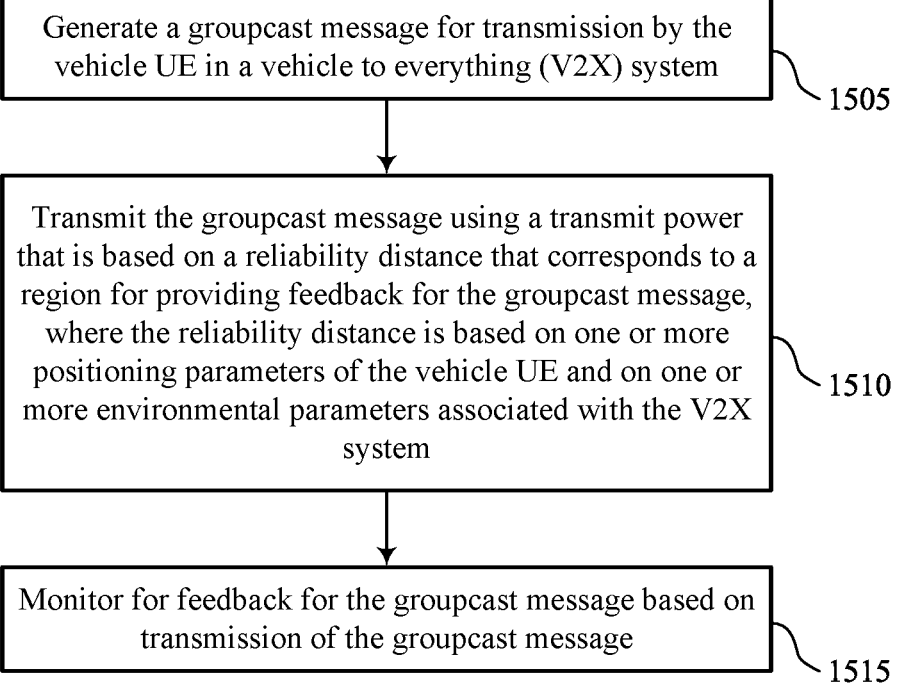

Generate a groupcast message for transmission by the vehicle UE in a vehicle to everything (V2X) system

1505

Transmit the groupcast message using a transmit power that is based on a reliability distance that corresponds to a region for providing feedback for the groupcast message, where the reliability distance is based on one or more positioning parameters of the vehicle UE and on one or more environmental parameters associated with the V2X system

1510

Monitor for feedback for the groupcast message based on transmission of the groupcast message

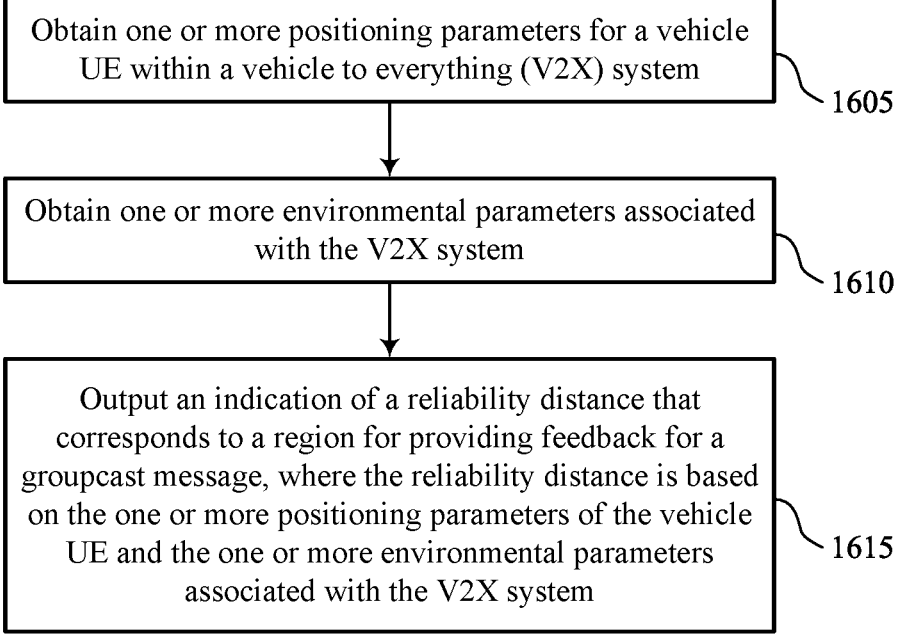

Obtain one or more positioning parameters for a vehicle
UE within a vehicle to everything (V2X) system
1605

Obtain one or more environmental parameters associated
with the V2X system
1610

Output an indication of a reliability distance that
corresponds to a region for providing feedback for a
groupcast message, where the reliability distance is based
on the one or more positioning parameters of the vehicle
UE and the one or more environmental parameters
associated with the V2X system
1615

DYNAMIC RELIABILITY DISTANCE FOR WIRELESS COMMUNICATIONS

FIELD OF TECHNOLOGY

The following relates to wireless communications, including dynamic reliability distance for wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

A vehicle UE (VUE) may communicate with other devices (e.g., UEs, network entity, roadside units (RSUs) or any combination thereof) in a wireless communication system with the VUE. Wireless communications may be associated with a feedback range, such that devices within feedback range may provide feedback to the VUE in response to one or more communications from the VUE.

SUMMARY

The described techniques relate to improved methods, systems, devices, and apparatuses that support dynamic reliability distance for wireless communications. For example, the described techniques provide for dynamically configuring a reliability distance for a groupcast message in a vehicle to everything (V2X) wireless communications system. A vehicle user equipment (VUE) may implement a transmission power for the groupcast message that corresponds to the reliability distance such that other VUEs within the reliability distance may receive the groupcast message and may perform maneuver coordination (or provide feedback) within the V2X system. The VUE or a network entity, such as a roadside unit (RSU), may dynamically adjust the reliability distance to include an interaction point (e.g., an intersection) or an interaction region. For example, as the VUE approaches the interaction point from a distance, the reliability distance may be larger to include the interaction region. Additionally, or alternatively, when the VUE is relatively closer to the interaction point or inside the interaction region, the reliability distance may be smaller, and therefore the VUE may utilize a smaller transmission power for the groupcast message.

A method for wireless communication by a VUE is described. The method may include generating a groupcast message for transmission by the VUE in a V2X system, transmitting the groupcast message using a transmit power that is based on a reliability distance that corresponds to a region for providing feedback for the groupcast message, where the reliability distance is based on one or more positioning parameters of the VUE and on one or more environmental parameters associated with the V2X system, and monitoring for feedback for the groupcast message based on transmission of the groupcast message.

A VUE for wireless communication is described. The VUE may include one or more memories storing processor executable code, and one or more processors coupled with the one or more memories. The one or more processors may individually or collectively operable to execute the code to cause the VUE to generate a groupcast message for transmission by the VUE in a V2X system, transmit the groupcast message using a transmit power that is based on a reliability distance that corresponds to a region for providing feedback for the groupcast message, where the reliability distance is based on one or more positioning parameters of the VUE and on one or more environmental parameters associated with the V2X system, and monitor for feedback for the groupcast message based on transmission of the groupcast message.

Another VUE for wireless communication is described. The VUE may include means for generating a groupcast message for transmission by the VUE in a V2X system, means for transmitting the groupcast message using a transmit power that is based on a reliability distance that corresponds to a region for providing feedback for the groupcast message, where the reliability distance is based on one or more positioning parameters of the VUE and on one or more environmental parameters associated with the V2X system, and means for monitoring for feedback for the groupcast message based on transmission of the groupcast message.

A non-transitory computer-readable medium storing code for wireless communication is described. The code may include instructions executable by a processor to generate a groupcast message for transmission by the VUE in a V2X system, transmit the groupcast message using a transmit power that is based on a reliability distance that corresponds to a region for providing feedback for the groupcast message, where the reliability distance is based on one or more positioning parameters of the VUE and on one or more environmental parameters associated with the V2X system, and monitor for feedback for the groupcast message based on transmission of the groupcast message.

In some examples of the method, VUE, and non-transitory computer-readable medium described herein, transmitting the groupcast message may include operations, features, means, or instructions for transmitting the groupcast message using the transmit power, where the transmit power may be based on a location of an interaction zone associated with the groupcast message and on an interaction region corresponding to the location of the interaction zone, where the reliability distance may be based on the location of the interaction zone associated with the groupcast message and on the interaction region corresponding to the location of the interaction zone.

In some examples of the method, VUE, and non-transitory computer-readable medium described herein, transmitting the groupcast message may include operations, features, means, or instructions for transmitting the groupcast message using the transmit power, where the transmit power may be based on a vehicle location of the VUE relative to the interaction zone associated with the groupcast message, where the one or more positioning parameters of the VUE include the vehicle location of the VUE.

In some examples of the method, VUE, and non-transitory computer-readable medium described herein, transmitting the groupcast message may include operations, features, means, or instructions for transmitting the groupcast message based on the reliability distance, where the reliability distance may be based on one or more static road parameters, one or more dynamic road parameters, one or more time specific road parameters, a sight stopping distance, or any combination thereof.

In some examples of the method, VUE, and non-transitory computer-readable medium described herein, transmitting the groupcast message may include operations, features, means, or instructions for transmitting the groupcast message based on the reliability distance, where the reliability distance may be based on a location of the VUE, a motion state of the VUE, or any combination thereof.

In some examples of the method, VUE, and non-transitory computer-readable medium described herein, transmitting the groupcast message may include operations, features, means, or instructions for transmitting the groupcast message based on the reliability distance, where the reliability distance may be based on information from a third party mapping service.

Some examples of the method, VUE, and non-transitory computer-readable medium described herein may further include operations, features, means, or instructions for receiving an indication of the reliability distance via a unicast message dedicated for the VUE, a radio resource control reconfiguration message, a PC5 radio resource control message, a PC5 sidelink message, a radio resource control message via a Uu communication link, or any combination thereof.

In some examples of the method, VUE, and non-transitory computer-readable medium described herein, the indication of the reliability distance may be received from a RSU.

In some examples of the method, VUE, and non-transitory computer-readable medium described herein, the indication of the reliability distance may be received as part of an advanced driver assistance systems (ADAS) map enhancement.

Some examples of the method, VUE, and non-transitory computer-readable medium described herein may further include operations, features, means, or instructions for receiving an indication of the one or more environmental parameters associated with the V2X system, where the reliability distance may be based on the indication of the one or more environmental parameters associated with the V2X system and on the one or more positioning parameters of the VUE.

In some examples of the method, VUE, and non-transitory computer-readable medium described herein, transmitting the groupcast message may include operations, features, means, or instructions for transmitting the groupcast message based on the reliability distance, where the reliability distance may be based on a service type of the VUE, the service type of the groupcast message, the service type of one or more UEs of the V2X system, or any combination thereof.

In some examples of the method, VUE, and non-transitory computer-readable medium described herein, the service type includes maneuver sharing, sensor sharing, collective perception, or any combination thereof.

A method for wireless communication by a network entity is described. The method may include obtaining one or more positioning parameters for a VUE within a V2X system, obtaining one or more environmental parameters associated with the V2X system, and outputting an indication of a reliability distance that corresponds to a region for providing feedback for a groupcast message, where the reliability distance is based on the one or more positioning parameters of the VUE and the one or more environmental parameters associated with the V2X system.

A network entity for wireless communication is described. The network entity may include one or more memories storing processor executable code, and one or more processors coupled with the one or more memories. The one or more processors may individually or collectively operable to execute the code to cause the network entity to obtain one or more positioning parameters for a VUE within a V2X system, obtain one or more environmental parameters associated with the V2X system, and output an indication of a reliability distance that corresponds to a region for providing feedback for a groupcast message, where the reliability distance is based on the one or more positioning parameters of the VUE and the one or more environmental parameters associated with the V2X system.

Another network entity for wireless communication is described. The network entity may include means for obtaining one or more positioning parameters for a VUE within a V2X system, means for obtaining one or more environmental parameters associated with the V2X system, and means for outputting an indication of a reliability distance that corresponds to a region for providing feedback for a groupcast message, where the reliability distance is based on the one or more positioning parameters of the VUE and the one or more environmental parameters associated with the V2X system.

A non-transitory computer-readable medium storing code for wireless communication is described. The code may include instructions executable by a processor to obtain one or more positioning parameters for a VUE within a V2X system, obtain one or more environmental parameters associated with the V2X system, and output an indication of a reliability distance that corresponds to a region for providing feedback for a groupcast message, where the reliability distance is based on the one or more positioning parameters of the VUE and the one or more environmental parameters associated with the V2X system.

Some examples of the method, network entities, and non-transitory computer-readable medium described herein may further include operations, features, means, or instructions for configuring the reliability distance based on the one or more environmental parameters, a service type of the VUE, and the service type of one or more other UEs of the V2X system.

In some examples of the method, network entities, and non-transitory computer-readable medium described herein, obtaining the one or more positioning parameters for the VUE may include operations, features, means, or instructions for obtaining a current vehicle location of the VUE and a motion state of the VUE.

In some examples of the method, network entities, and non-transitory computer-readable medium described herein, outputting the indication of the reliability distance may include operations, features, means, or instructions for predicting a future location of the VUE at a future time, the predicted future location of the VUE based on a current vehicle location of the VUE, the motion state of the VUE, the one or more environmental parameters associated with the V2X system, information associated with the destination of the VUE, historical location information of the VUE, or any combination thereof.

In some examples of the method, network entities, and non-transitory computer-readable medium described herein, outputting the indication of the reliability distance may include operations, features, means, or instructions for outputting the indication of the reliability distance based on determining the reliability distance based on the predicted future location of the VUE.

In some examples of the method, network entities, and non-transitory computer-readable medium described herein, outputting the indication of the reliability distance may include operations, features, means, or instructions for outputting the indication of the reliability distance based on a service type of the V2X system.

In some examples of the method, network entities, and non-transitory computer-readable medium described herein, outputting the indication of the reliability distance may include operations, features, means, or instructions for outputting the indication of the reliability distance to the VUE or, the indication of the reliability distance to one or more other UEs associated with the V2X system, or both.

Some examples of the method, network entities, and non-transitory computer-readable medium described herein may further include operations, features, means, or instructions for communicating with one or more other UEs within the V2X system to obtain one or more conditions of the V2X system.

Some examples of the method, network entities, and non-transitory computer-readable medium described herein may further include operations, features, means, or instructions for sensing, using one or more sensors, one or more conditions of the V2X system.

Some examples of the method, network entities, and non-transitory computer-readable medium described herein may further include operations, features, means, or instructions for communicating with one or more other UEs within the V2X system and configuring the reliability distance based on communicating with the one or more other UEs within the V2X system.

In some examples of the method, network entities, and non-transitory computer-readable medium described herein, the reliability distance may be based on an interaction region corresponding to the location of an interaction zone associated with the groupcast message and on an interaction region corresponding to the location of the interaction zone.

In some examples of the method, network entities, and non-transitory computer-readable medium described herein, outputting the indication of the reliability distance may include operations, features, means, or instructions for outputting the indication of the reliability distance, where the reliability distance may be based on a vehicle location of the VUE relative to the interaction zone.

In some examples of the method, network entities, and non-transitory computer-readable medium described herein, outputting the indication of the reliability distance may include operations, features, means, or instructions for outputting the indication of the reliability distance, where the reliability distance may be based on one or more static road parameters, one or more dynamic parameters, one or more time-specific parameters, a sight stopping distance, or any combination thereof.

In some examples of the method, network entities, and non-transitory computer-readable medium described herein, obtaining the one or more positioning parameters for the VUE may include operations, features, means, or instructions for obtaining the one or more positioning parameters for the VUE from a third party mapping service.

In some examples of the method, network entities, and non-transitory computer-readable medium described herein, outputting the indication of the reliability distance may include operations, features, means, or instructions for outputting the indication of the reliability distance as part of an ADAS map enhancement.

BRIEF DESCRIPTION OF THE DRAWINGS

FIGS. 15 and 16 show flowcharts illustrating methods that support dynamic reliability distance for wireless communications in accordance with one or more aspects of the present disclosure.

DETAILED DESCRIPTION

Figure 1:
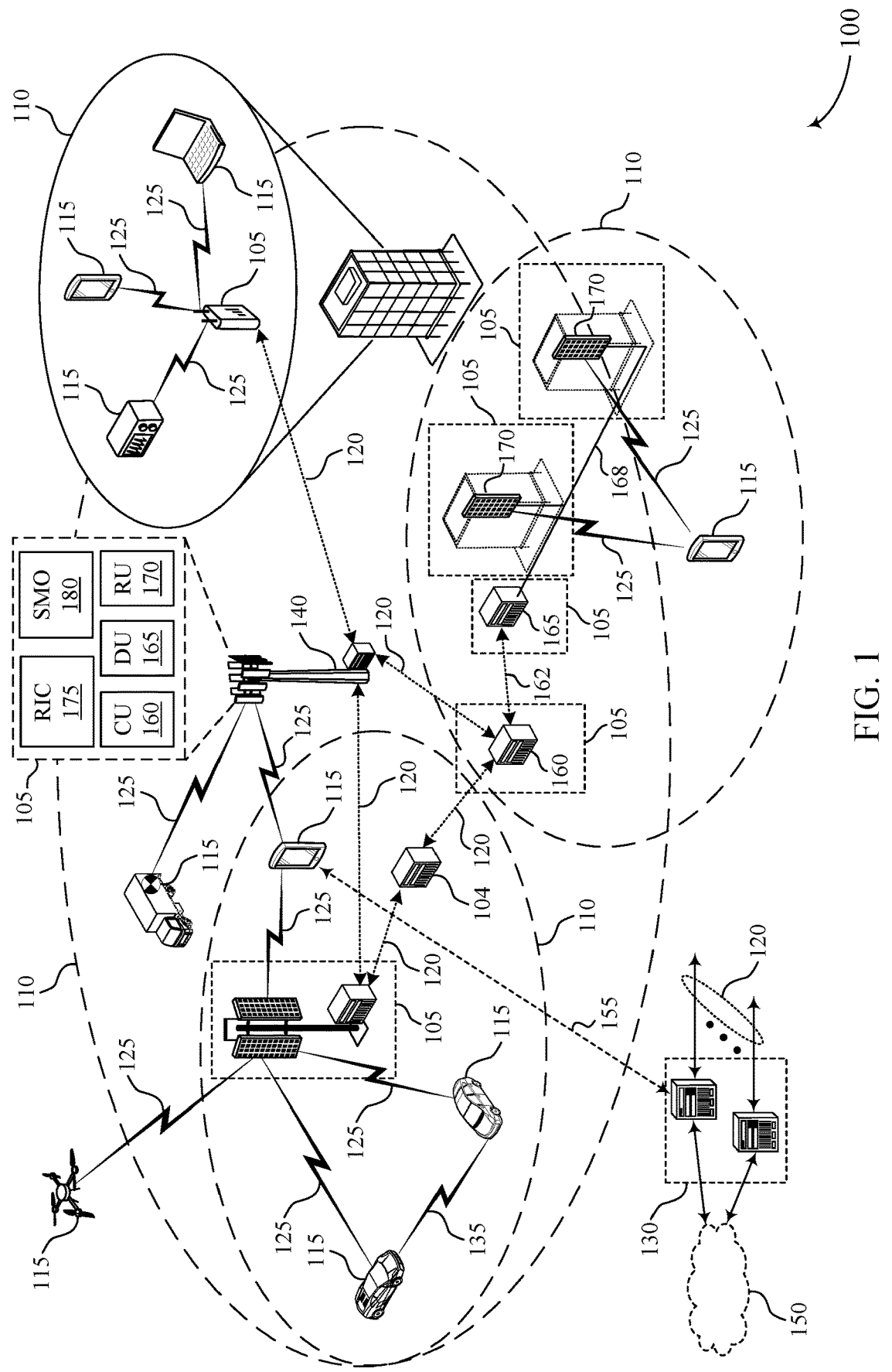
FIG. 1 shows an example of a wireless communications system that supports dynamic reliability distance for wireless communications in accordance with one or more aspects of the present disclosure.

Some wireless communications systems, such as a vehicle to everything (V2X) system, may support advanced driver assistance systems (ADAS), in which a user equipment (UE) or a vehicle UE (VUE) may transmit sensor information (e.g., sensor sharing data) or maneuver coordination information to other devices, such as other VUEs, network entities, or roadside units (RSUs), among other examples. In some cases, the VUE may transmit the sensor information, maneuver coordination information, or any combination thereof using a connectionless or distance-based groupcast message. For example, the VUE may implement a transmission power based on a reliability distance such that devices within the reliability distance may receive the transmission with high probability (e.g., a likelihood of successful reception being above a threshold). In some cases, sensor information and maneuver coordination information may be transmitted with high reliability to devices at or near interaction points, such as locations where interactions between vehicles, devices, or objects in a V2X system may occur. For example, an emergency vehicle may transmit information to devices located within a range of an upcoming intersection of roadways. However, enforcing high reliability beyond an interaction point may be inefficient in terms of transmission power and overhead. Additionally, because the distance between the VUE (e.g., the emergency vehicle) and the interaction point (e.g., the intersection) varies as the VUE approaches, passes, and recedes from the interaction point, the distance for maintaining sufficient reliability may also vary. As such, dynamic determination of the reliability distance may increase efficiency and decrease overhead.

The VUE or a network entity within the V2X system may dynamically determine the reliability distance for distanced-based groupcast. For example, the reliability distance may be based on positioning parameters of the VUE (e.g., vehicle location, vehicle motion state, or any combination thereof) and environmental parameters associated with the V2X system (e.g., road topology, message type, or any combination thereof). The reliability distance may be indicated within a message (which may be transmitted to the VUE by a network entity), may be part of a map enhancement, or the VUE may determine the reliability distance if the VUE is provided with environmental parameters associated with the V2X system. In some cases, the network entity or the VUE may dynamically adjust the reliability distance as the VUE approaches and recedes from the interaction point. For example, when the VUE is farther away from the interaction point, the reliability distance may be relatively larger than when the VUE is closer to the interaction point. By decreasing the reliability distance when the VUE is closer to the interaction point, the VUE may conserve transmission power and decrease overhead.

Aspects of the disclosure are initially described in the context of wireless communications systems. Aspects of the disclosure are also described in the context of wireless communications systems and process flows. Aspects of the disclosure are further illustrated by and described with reference to apparatus diagrams, system diagrams, and flowcharts that relate to dynamic reliability distance for wireless communications.

FIG. 1 shows an example of a wireless communications system 100 that supports dynamic reliability distance for wireless communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack.

The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c. F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support dynamic reliability distance for wireless communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using V2X communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as RSUs, or with the network via one or more network nodes (e.g., network entities 105, base stations 140, RUs 170) using vehicle-to-network (V2N) communications, or with both.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some cases, the wireless communications system 100 may support V2X communication, and a UE 115 may be a vehicle, referred to as a VUE 115, and may be capable of transmitting sensor information and maneuver coordination information to other devices such as other VUEs 115, network entities 105, or RSUs, using a connectionless or distance-based groupcast. For example, the VUE 115 may implement a transmission power based on a reliability distance such that devices within the reliability distance may receive and respond to the transmission, if appropriate. In some cases, sensor information and maneuver coordination information may be transmitted with high reliability to devices at or near interaction points, such as locations where interactions between vehicles or objects in the wireless communications system 100 may occur. For example, incidents resulting from failed communications (e.g., crashes) may be more likely at or near interaction points, and the wireless communications system 100 may be configured with one or more safety standards, which may include meeting a degree of reliability (e.g., high reliability) when transmitting sensor information and maneuver coordination information near interaction points. High reliability messages may be sent using a given transmit power, MCS, or repetition rate to meet a target reliability. Because the distance between the VUE 115 and the interaction point (e.g., an intersection) varies as the VUE 115 approaches and recedes from the interaction point, the distance for maintaining sufficient reliability may also vary. As such, dynamic determination of the reliability distance may increase efficiency and decrease overhead.

The VUE 115 or the network entity 105 within the wireless communications system 100 may dynamically determine the reliability distance for distanced-based groupcast. For example, the reliability distance may be based on positioning parameters of the VUE 115 (e.g., vehicle location, vehicle motion state information such as speed, direction, or any combination thereof) and environmental parameters associated with the wireless communications system 100 (e.g., road topology, message type, or any combination thereof). The reliability distance may be transmitted to the VUE 115 by a network entity 105, may be part of a map enhancement, or the VUE 115 may determine the reliability distance if the VUE 115 is provided with environmental parameters associated with the wireless communications system 100. In some cases, the network entity 105 or the VUE 115 may dynamically adjust the reliability distance as the VUE 115 approaches and recedes from the interaction point. For example, when the VUE 115 is farther away from the interaction point, the reliability distance may be relatively larger than when the VUE 115 is closer to the interaction point. By decreasing the reliability distance when the VUE 115 is closer to the interaction point, the VUE 115 may conserve transmission power, improve resource usage, and decrease overhead.

Figure 2:
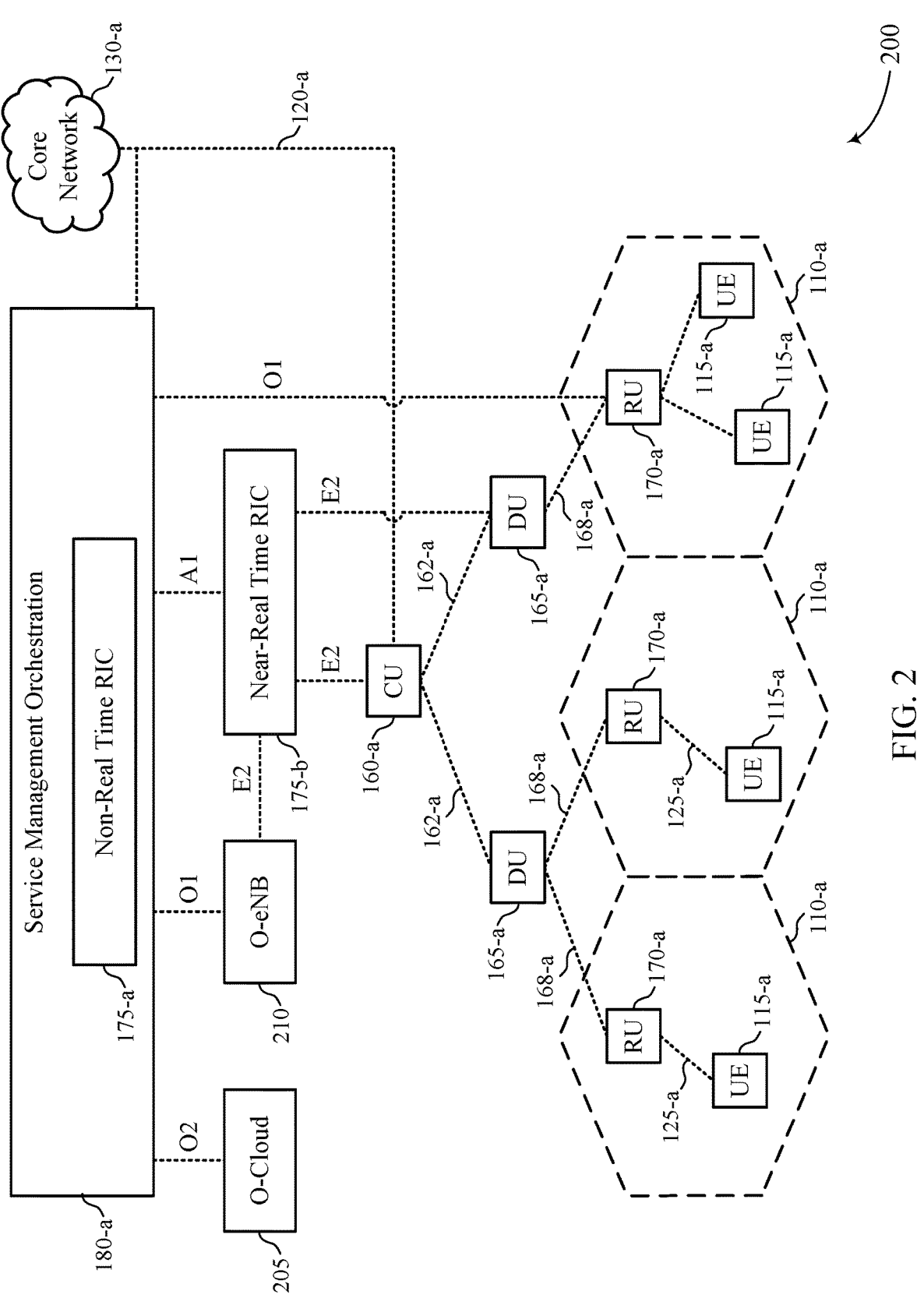
FIG. 2 shows an example of a network architecture that supports dynamic reliability distance for wireless communications in accordance with one or more aspects of the present disclosure.

FIG. 2 shows an example of a network architecture 200 (e.g., a disaggregated base station architecture, a disaggregated RAN architecture) that supports dynamic reliability distance for wireless communications in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*. RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as appropriate, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an inter-face configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage targets which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*. DUs 165-*a*. RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support func-tionality of the SMO 180-*a*.

The Non-RT RIC 175-*a* may be configured to include a logical function that enables non-real-time control and opti-mization of RAN elements and resources, Artificial Intelli-gence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via 01) or via generation of RAN management policies (e.g., A1 policies).

A UE 115 (e.g., a VUE) may transmit sensor information and maneuver coordination information to other devices such as other UEs 115, network entities, or RSUs, using a connectionless or distance-based groupcast. For example, the UE 115 may implement a transmission power based on a reliability distance such that devices within the reliability distance may receive the transmission. In some cases, sensor information and maneuver coordination information may be transmitted with high reliability to devices at or near inter-action points, such as locations where interactions between vehicles or objects in a V2X system may occur. Because the distance between the UE 115 and the interaction point (e.g., an intersection) varies as the UE 115 approaches and recedes from the interaction point, the distance for maintaining sufficient reliability may also vary. As such, dynamic deter-mination of the reliability distance may increase efficiency and decrease overhead.

The UE 115 or the network entity within the V2X system may dynamically determine the reliability distance for dis-tanced-based groupcast. For example, the reliability distance may be based on positioning parameters of the UE 115 (e.g., vehicle location, vehicle motion state, or any combination thereof) and environmental parameters associated with the V2X system (e.g., road topology, transmitted message type, or any combination thereof). The reliability distance may be transmitted to the UE 115 by a network entity, may be part of a map enhancement, or the UE 115 may determine the reliability distance if the UE 115 is provided with environ-mental parameters associated with the V2X system. In some cases, the network entity or the UE 115 may dynamically adjust the reliability distance as the UE 115 approaches and recedes from the interaction point. For example, when the UE 115 is farther away from the interaction point, the reliability distance may be relatively larger than when the UE 115 is closer to the interaction point. By decreasing the reliability distance when the UE 115 is closer to the inter-action point, the UE 115 may conserve transmission power, improve network efficiency and use of network resources, and decrease overhead.

Figure 3:
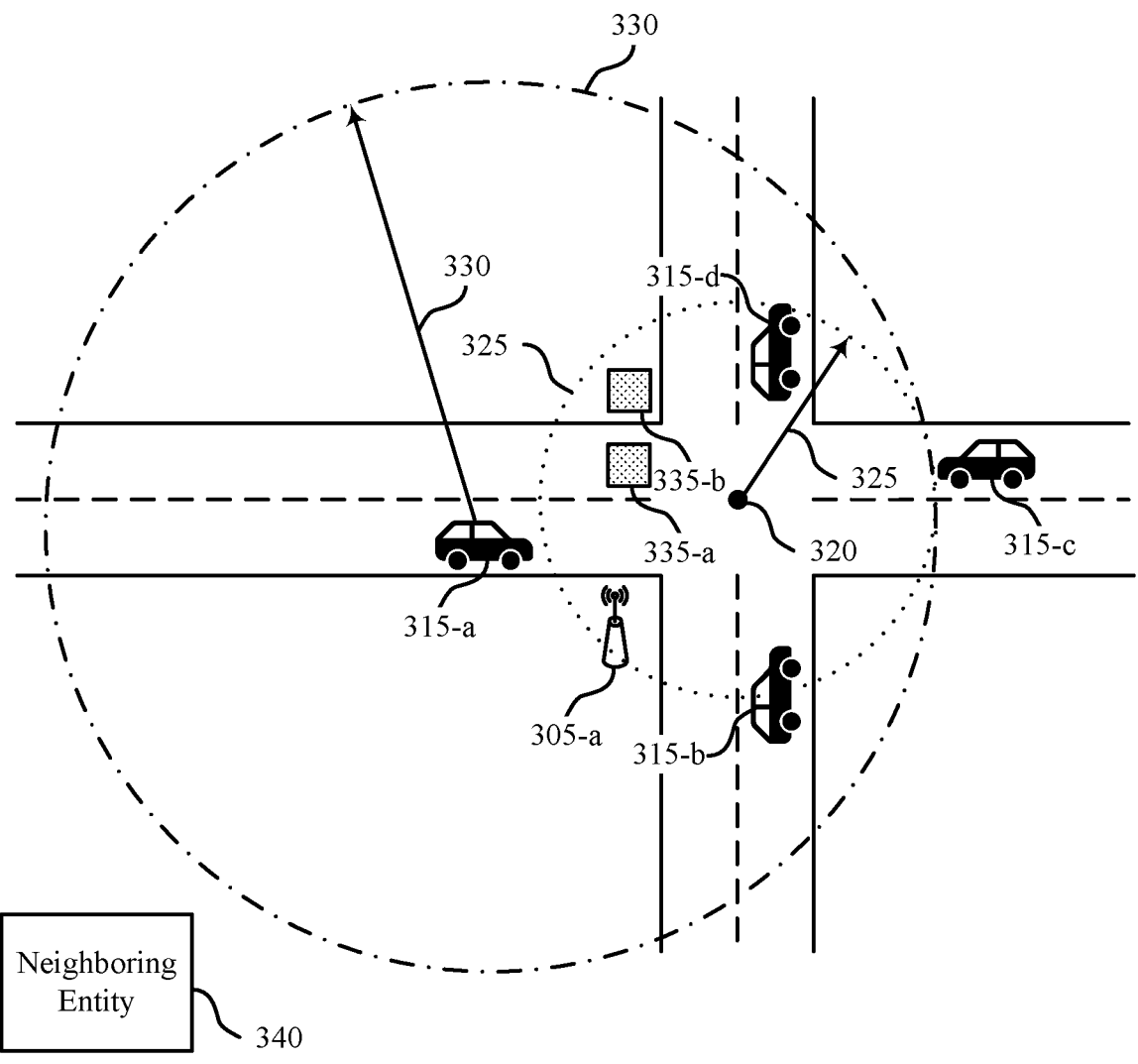
FIGS. 3, 4A, 4B, and 4C show examples of wireless communications systems that supports dynamic reliability distance for wireless communications in accordance with one or more aspects of the present disclosure.

FIG. 3 shows an example of a wireless communications system 300 that supports dynamic reliability distance for wireless communications in accordance with one or more aspects of the present disclosure. Wireless communications system 300 may support V2X communication/operations. In some cases, wireless communications system 300 may also support a driver assistance system, such as ADAS. The wireless communications system 300 may include VUEs 315, which may be examples of UEs 115 and VUEs 115 as described with reference to FIGS. 1 and 2. The Wireless communications system 300 may also include one or more RSUs 305, which may be examples of network entities 105 as described with reference to FIGS. 1 and 2.

In some cases, a VUE 315-*a* may transmit sensor sharing information, maneuver coordination information, or other application-layer V2X messages or information, with other devices in the wireless communications system 300, such as other VUE 315-*b*, VUE 315-*c*. VUE 315-*d*, and RSU 305-*a*, among other examples. In some cases, the VUE 315-*a* may transmit the sensor information, maneuver coordination information, or any combination thereof using a connection-less or distance-based groupcast message. For example, the VUE 315-*a* may utilize a transmit power that corresponds to a reliability distance 330 such that devices within the reliability distance 330 may receive the groupcast message.

In some cases, sensor information and maneuver coordina-tion information may be transmitted with a given reliability to devices within a range of an interaction point 320. In some cases, the interaction point 320 may be a location within an interaction region 325 where interactions between vehicles or objects in the Wireless communications system 300 may occur, such as an intersection. For example, VUE 315-*a* may be an emergency vehicle and may transmit information to devices (e.g., other VUEs 315) located near an upcoming intersection. However, enforcing high reliability beyond the interaction point 320 may be inefficient in terms of trans-mission power and overhead. Because the distance between the VUE 315-*a* (e.g., the emergency vehicle) and the inter-action point 320 (e.g., the intersection) varies as the VUE 315-*a* approaches and recedes from the interaction point, the distance for maintaining sufficient reliability may also vary. As such, dynamic determination of the reliability distance 330 may increase efficiency and decrease overhead.

To increase efficiency and decrease overhead, the VUE 315-*a* or a network entity within the Wireless communica-tions system 300, such as RSU 305-*a*, may dynamically determine the reliability distance 330 for distanced-based groupcast. The reliability distance 330 may correspond a NACK region, or a region in which the VUE 315-*a* may receive feedback from other devices (e.g., other VUEs 315). The reliability distance 330 may be dynamically determined to include the interaction region 325, which may be a region where maneuver coordination or sensor information mes-sages may be expected. In some cases, knowledge of the interaction region 325 (e.g., region size and proximity) may enable dynamic adjustment of the NACK region. For example, based on the reliability distance 330, VUE 315-*a* may transmit a groupcast message using a transmit power that is based on (e.g., corresponds to) the location of the interaction region 325 (e.g., an interaction zone). In some cases, the transmit power may also correspond to the loca-tion of VUE 315-*a* relative to the interaction region 325.

The reliability distance 330 (e.g., a NACK distance or a NACK region) may be a function of distance from an interaction point 320 or a feature of the Wireless commu-nications system 300 based on positioning parameters of the VUE 315-*a* (e.g., vehicle location, vehicle motion state, or any combination thereof) and environmental parameters 335 associated with the Wireless communications system 300 (e.g., road topology, transmitted message type, or any com-bination thereof). Environmental parameters 335 may be static (e.g., intersections, merging zones, round-abouts, on-ramps, off-ramps, among other examples) or may be dynamic (e.g., construction zones or parades, among other examples). Environmental parameters 335 may also be time-specific, such as school zones or public transit routes, among other examples. Environmental parameters 335 may also be associated with a location and size of an interaction point 320 (e.g., an intersection). In an example, environ-mental parameter 335-*a* may be an obstruction associated with the road topology (e.g., associated with construction or road imperfections), and environmental parameter 335-*b* may be a pedestrian preparing to cross the road. In some cases, the reliability distance 330 may also be based on a service type of VUE 315-*a*, a service type of the groupcast message, a service type of one or more other VUEs 315, a service type of the Wireless communications system 300 (e.g., maneuver sharing, sensor information, collective per-ception, or any combination thereof), a stopping distance (e.g., a sight stopping distance) associated with the VUE 315-*a* or other VUEs 315, or any combination thereof.

In some cases, the reliability distance 330 may be added as a map overlay, such as an overlay of a ADAS map for VUE 315-*a*. In some cases, neighboring entity 340 (e.g., a cloud entity, a network entity, a third-party mapping service) may include a database of environmental parameters 335 and reliability distances 330 for the Wireless communications system 300. The neighboring entity 340 may receive positioning parameters from the network (e.g., the core network as described with reference to FIG. 1), the cloud via a basic safety message (BSM), a mapping service input, or any combination thereof.

In some cases, the RSU 305-*a* or a network entity may determine the reliability distance 330. The RSU 305-*a* may communicate with other VUEs 315 (e.g., VUE 315-*b*, VUE 315-*c*, and VUE 315-*d*) to obtain environmental parameters 335. Additionally, or alternatively, the RSU 305-*a* may obtain environmental parameters 335 through sensors of the RSU 305-*a* (e.g., cameras, stop lights, signage). The RSU 305-*a* may also communicate with the VUE 315-*a* to obtain positioning parameters of the VUE 315-*a*. The RSU 305-*a* may communicate with the VUEs 315 to configure the reliability distance individually or based on groups or zones. The RSU 305-*a* may indicate the reliability distance 330 to the VUE 315-*a*. In some cases, the RSU 305-*a* may indicate the reliability distance 330 to one or more other VUEs 315 (e.g., VUE 315-*b*). In some cases, the RSU 305-*a* may transmit dedicated signaling (e.g., application-layer signaling), broadcast signaling, groupcast signaling, or any combination thereof, indicating the reliability distance 330. In some cases, an indication of the reliability distance 330 may include an array of pairwise values of NACK distance and interaction point 320 distance. For example, if the reliability distance 330 is 300 meters and if the interaction point 320 is 500 meters away from VUE 315-*a*, the indication of the reliability distance 330 may include the array of pairwise values (300, 500). In some cases, and indication of the reliability distance 330 may include inputs for a formula (e.g., a formulaic). For example, the formula for the reliability distance 330 may be $$N = \left(\frac{D}{2}\right) \times A + L,$$

where N may be the reliability distance 330 (e.g., distance-based groupcast feedback (NACK) distance), D may be the interaction region 325 size (e.g., the diametric size of a region for reliable groupcast), L may be the VUE 315-*a* distance (e.g., the distance between VUE 315-*a* and the interaction point 320), and A may be a NACK range adjustment multiplier. In some cases, the formula for the reliability distance 330 may also include an indication of the interaction point 320 or a center of an interaction region 325, which may include a latitude and longitude of the interaction point 320. In the case of the reliability distance 330 being determined by the formula, the VUE 315-*a* may receive one or more of the inputs for the formula (e.g., D, L. A, or any combination thereof). In some cases, the indication of the reliability distance may include enumerated values, such as latitude and longitude micro degree indications, a range value, and a distance from the interaction point.

In some cases, the VUE 315-*a* may determine the reliability distance 330. For example, the RSU 305-*a* may provide the VUE 315-*a* with the environmental parameters 335. Based on the environmental parameters 335 and positioning parameters of the VUE 315-*a*, the VUE 315-*a* may determine the reliability distance. Whether the VUE 315-*a* determines the reliability distance 330 or receives an indication of the reliability distance 330, the VUE 315-*a* may transmit a groupcast message with the corresponding transmit power.

Figures 4A, 4B, 4C:
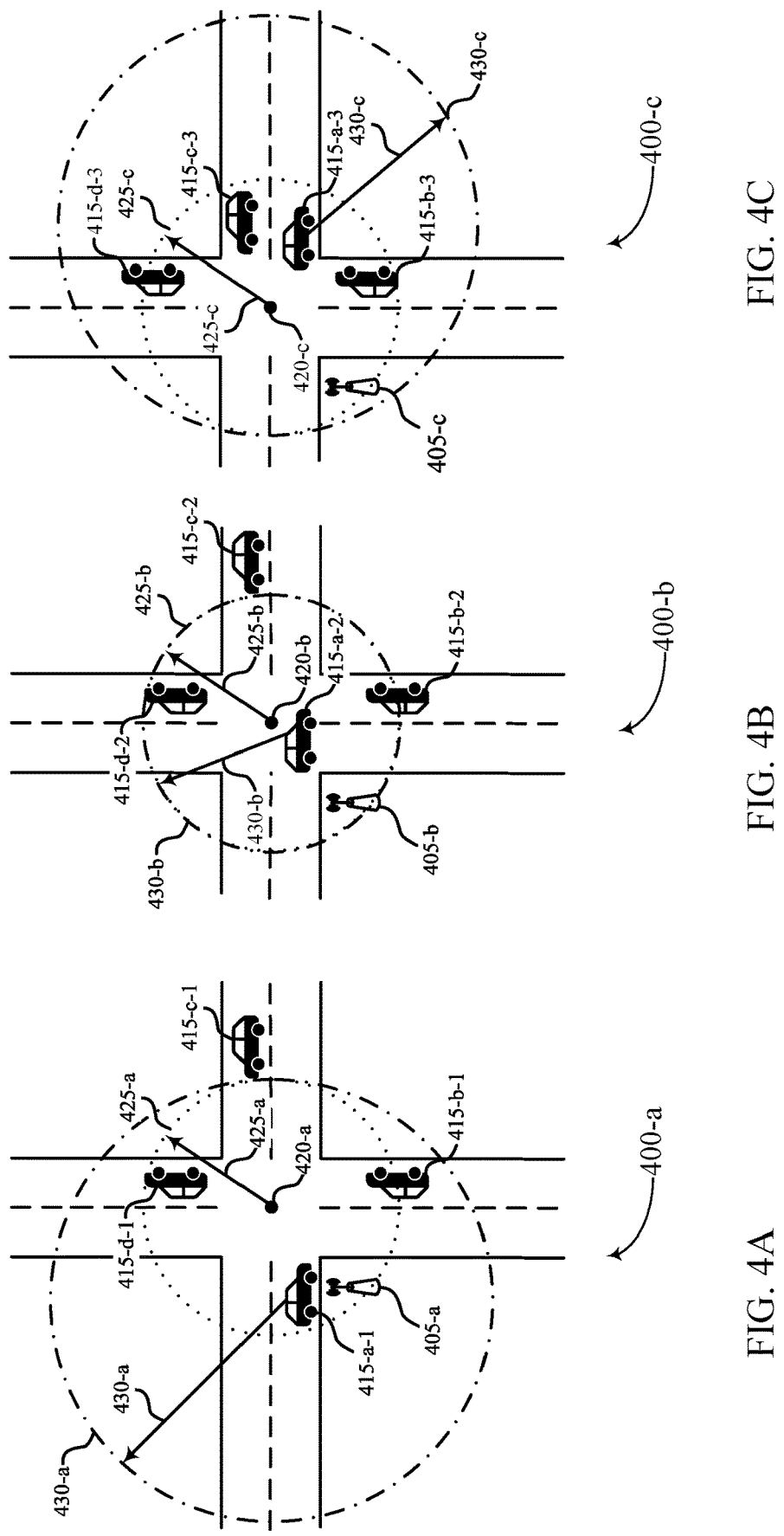

FIG. 4A shows an example of wireless communications system 400-*a* that supports dynamic reliability distance for wireless communications in accordance with one or more aspects of the present disclosure. Wireless communications system 400-*a* may support V2X communications/operations. Wireless communications system 400-*a* may include VUEs 415 and RSU 405, which may be examples of VUEs 315 and RSU 305 as described with reference to FIG. 3.

As described with reference to FIG. 3, the reliability distance 430 may be dynamically adjusted based on environmental parameters of the wireless communications system 400-*a* and positioning parameters of VUE 415-*a* (e.g., the location of VUE 415-*a* relative to the interaction point 420 or the interaction region 425-*a*).

Wireless communications system 400-*a* may represent a first time when VUE 415-*a*-1 is approaching an interaction point 420-*a*. The interaction point 420-*a* may be within an interaction region 425-*a*, as described with reference to FIG. 3. As described with reference to FIG. 3, a reliability distance 430-*a* corresponding to a NACK region for a groupcast message may be dynamically adjusted to include the interaction region 425-*a* and may be centered on the VUE 415-*a*-1 (e.g., by RSU 405-*a* or VUE 415-*a*-1). For example, based on the reliability distance 430-*a*, other VUEs 415 of the wireless communications system 400-*a* may receive the groupcast message. For example, VUE 415-*b*-1 and VUE 415-*d*-1 may be within the interaction region 425-*a* and may receive the groupcast message, alternatively, VUE 415-*c*-1 may be outside the interaction region 425-*a* and may not receive the groupcast message.

FIG. 4B shows an example of wireless communications system 400-*b* that supports dynamic reliability distance for wireless communications in accordance with one or more aspects of the present disclosure. Wireless communications system 400-*b* may support V2X communications/operations. Wireless communications system 400-*b* may include VUEs 415 and RSU 405, which may be examples of VUEs 315 and RSU 305 as described with reference to FIG. 3 and VUEs 415 and RSU 405 as described with reference to FIG. 4A.

Wireless communications system 400-*b* may represent wireless communications system 400-*a* at a second time, when VUE 415-*a*-2 may be closer to the interaction point 420-*b* than VUE 415-*a*-1 is to interaction point 420-*a*. At the second time, the reliability distance 430-*b* may be dynamically adjusted to include the interaction region 425-*b* (e.g., by RSU 405-*b* or VUE 415-*a*-2). In some cases, reliability distance 430-*b* may be smaller than the reliability distance 430-*a*. In some cases, when VUE 415-*a* is close to the interaction point 420-*b*, the reliability distance 430-*b* may be the same size or close to the same size as the interaction region 425-*b*. In some cases, VUE 415-*b*-2 and VUE 415-*d*-2 may be within the reliability distance 415-*b* and may receive the groupcast message. Additionally, or alternatively, VUE 415-*c*-2 may be outside the reliability distance 430-*b* and may not receive the groupcast message.

FIG. 4C shows an example of wireless communications system 400-*c* that supports dynamic reliability distance for wireless communications in accordance with one or more aspects of the present disclosure. Wireless communications system 400-*c* may support V2X communications/operations. Wireless communications system 400-*c* may include VUEs 415 and RSU 405, which may be examples of VUEs 315 and RSU 305 as described with reference to FIG. 3 and VUEs 415 and RSU 405 as described with reference to FIG. 4A and FIG. 4B.

Wireless communications system 400-c may represent wireless communications system 400-a and wireless communications system 400-b at a third time, such as when VUE 415-a-3 has passed the interaction point 420-c. At the third time, the reliability distance 430-c may be dynamically adjusted to include the interaction region 425-c (e.g., by RSU 405-c or VUE 415-a-3). In some cases, the reliability distance 430-c may be larger than the reliability distance 430-b. In some cases, VUE 415-b-3, VUE 415-c-3, and VUE 415-d-3 may be within the reliability distance 430-c and may receive the groupcast message.

Figure 5:
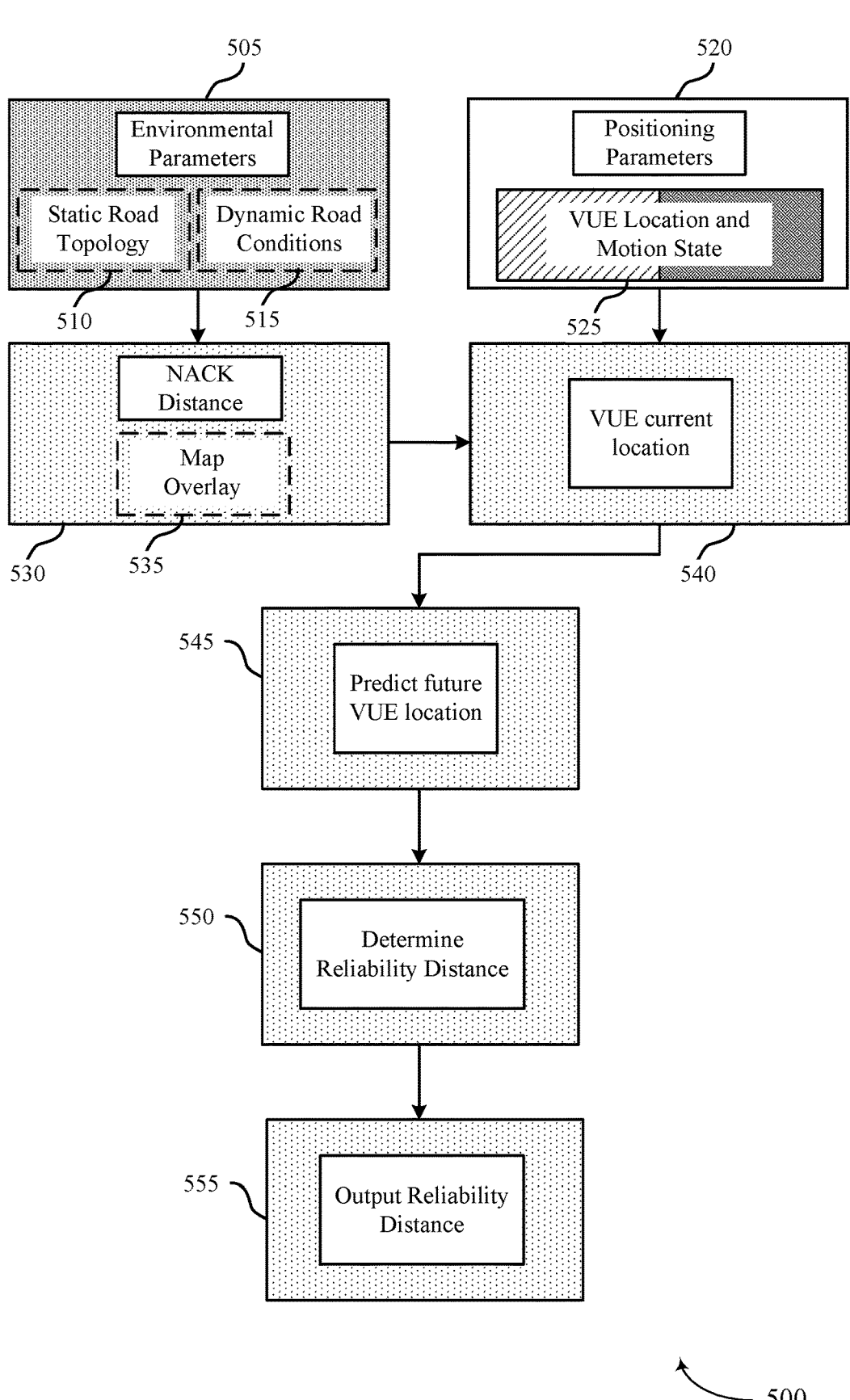
FIGS. 5 and 6 show examples of process flows that supports dynamic reliability distance for wireless communications in accordance with one or more aspects of the present disclosure.

FIG. 5 shows an example of a process flow 500 that supports dynamic reliability distance for wireless communications in accordance with one or more aspects of the present disclosure. In some cases, elements may be added to or removed from process flow 500.

Environmental parameters 505 may be used to determine a NACK distance 530. In some cases, environmental parameters 505 may be map-related inputs. In some cases, as described with reference to FIG. 3, environmental parameters 505 may include static road topology 510, dynamic road conditions 515, or any combination thereof. In some cases, the NACK distance 530 may correspond to the reliability distance as described with reference to FIGS. 3 and 4. In some cases, the NACK distance 530 may include a map overlay 535, as described with reference to FIG. 3.

Positioning parameters 520 may be used to determine a VUE current location 540. In some cases, positioning parameters 520 may include a VUE location and motion state 525. In some cases, the VUE location and motion state 525 may be received from the VUE, an RSU, a network entity, a third-party map or tracking service, or any combination thereof.

At 545, the VUE current location 540 and positioning parameters 520, together with the NACK distance 530, may be used to predict a future location of the VUE. In some cases, a cloud entity may predict the future location of the VUE. In some cases, the future location may be based on the current location and motion state of the VUE, road topology, destination information from a third party mapping service, historical motion patterns, time-of-day, or any combination thereof.

At 550, based on the predicting the future location of the VUE, a reliability distance may be determined. In some cases, the reliability distance may be a distance-based groupcast communication NACK distance. In some cases, the reliability distance may be service-type specific, such as if the V2X system includes a sensor information, collective perception, or maneuver coordination system. In some cases, the cloud entity may determine the reliability distance.

At 555, based on determining the reliability distance, the cloud entity, an RSU, a network entity, or any combination thereof may output the reliability distance. In some cases, the reliability distance may be individually output to the VUE via dedicated signaling. In some cases, the reliability distance may be output to multiple VUEs via common signaling.

Figure 6:
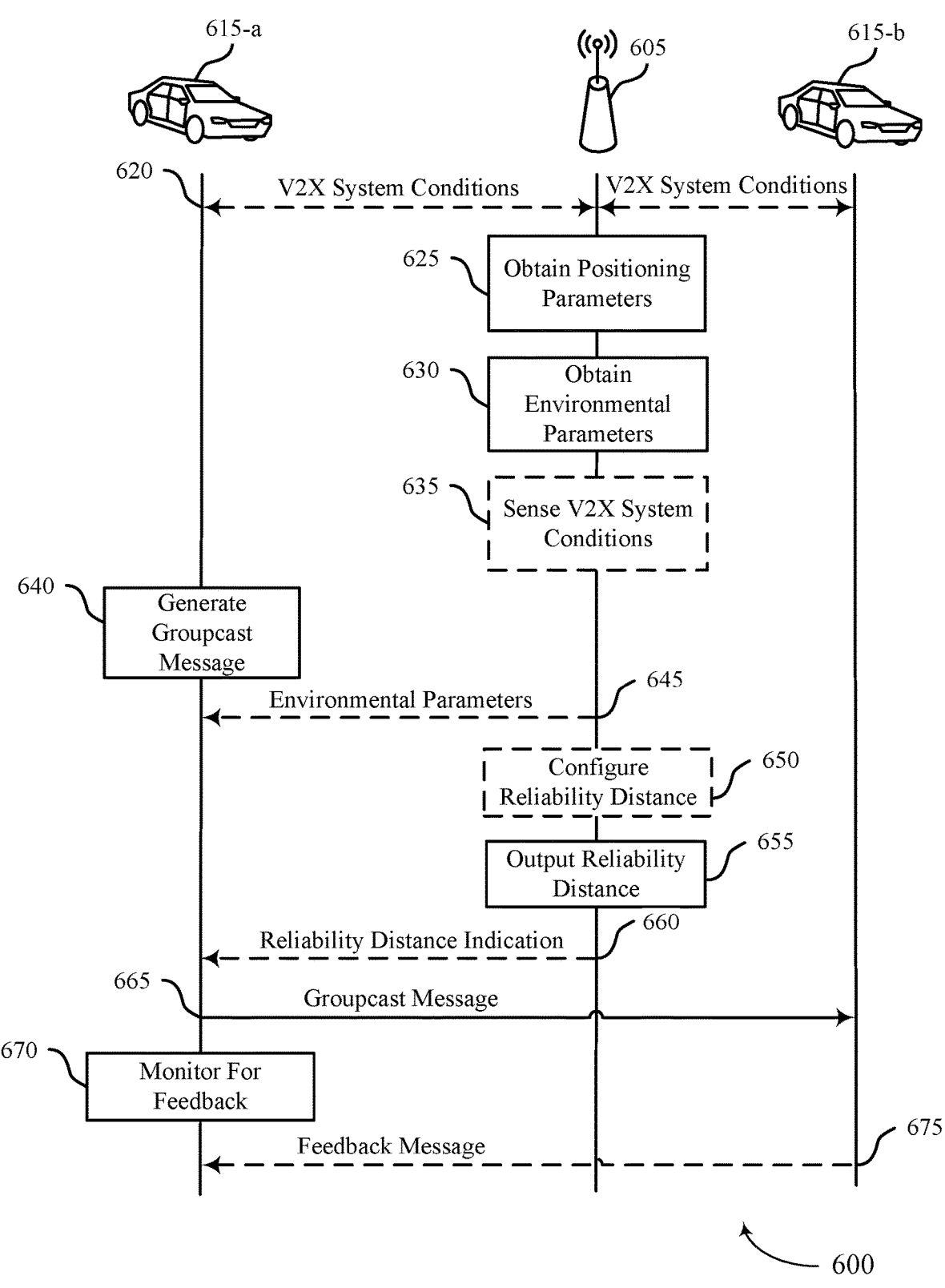

FIG. 6 shows an example of a process flow 600 that supports dynamic reliability distance for wireless communications in accordance with one or more aspects of the present disclosure. The process flow 600 may implement various aspects of the present disclosure described with reference to FIGS. 1-5. The process flow 500 may include a VUE 615-a, a VUE 615-b, and an RSU 605, which may be examples of VUEs, RSUs, and network entities as described with reference to FIGS. 1-5.

It is understood that the devices described by the process flow 600 may communicate with or be coupled with other devices or nodes that are not illustrated. For example, VUE 615-a and RSU 605 may communicate with one or more other UEs, network entities, or other devices. Alternative examples of the following may be implemented, where some steps may be performed in a different order than described or may not be performed at all. In some cases, a step may include additional features not mentioned below, or further steps may be added.

In some cases, at 620, VUE 615-a, VUE 615-b, RSU 605, or any combination thereof may transmit V2X system conditions. For example, RSU 605 may communicate with VUEs 615 to obtain one or more conditions of the V2X system. In some cases, V2X system conditions may include positioning parameters of VUE 615-a or environmental parameters associated with the V2X system, as described with reference to FIGS. 3-5.

At 625, RSU 605 may obtain positioning parameters. For example, RSU 605 may obtain one or more positioning parameter of VUE 615-a. In some cases, RSU 605 may obtain the positioning parameters may include the current vehicle location of VUE 615-a, the motion state (e.g., velocity, heading) of VUE 615-a, or any combination thereof. In some cases, based on the positioning parameters, RSU 605 may predict a future location of VUE 615-a at a future time. For example, where the predicted future location of VUE 615-a may be based on the current vehicle location of VUE 615-a, environmental parameters associated with the V2X system, information associated with the destination of VUE 615-a, historical location information of VUE 615-a, or any combination thereof. In some cases, RSU 605 may obtain the positioning parameters from VUE 615-a, from one or more sensors of the RSU 605, from a third-part mapping service, from the core network, from a cloud entity, or any combination thereof.

At 630, RSU 605 may obtain one or more environmental parameters of the V2X system. In some cases, RSU 605 may obtain environmental parameters from one or more sensors of the RSU 605, from one or more VUEs 615, from a third-party mapping service, from the core network, or any combination thereof.

In some cases, at 635, RSU 605 may sense V2X system conditions. For example, RSU 605 may use one or more sensors of RSU 605 (e.g., cameras) to sense conditions of the V2X system (e.g., environmental parameters, positioning parameters).

At 640, VUE 615-a may generate a groupcast message. The groupcast message may include sensor information, maneuver coordination information, or any combination thereof relative to the V2X system. In some cases, the groupcast message may include information related to the VUE 615-a and an interaction point or an interaction region.

In some cases, at 645, RSU 605 may transmit and VUE 615-a may receive, one or more environmental parameters. For example, the groupcast message may be transmitted based on a reliability distance, where the reliability distance is based on the positioning parameters of VUE 615-a and environmental parameters associated with the V2X system, and if the VUE 615-a determines the reliability distance, as described with reference to FIG. 3, the VUE 615-a may use the one or more environment parameters provided by the RSU 605 in combination with one or more positioning parameters of the VUE 615-*a* to determine the reliability distance.

In some cases, at 650, RSU 605 may configure the reliability distance, as described with reference to FIG. 3. RSU 605 may configure the reliability distance based on the one or more environmental parameters, a service type of VUE 615-*a*, the service type of one or more other VUEs 615 (e.g., VUE 615-*b*), or any combination thereof. In some cases, RSU 605 may configure the reliability distance based on communicating with VUE 615-*a* (e.g., to obtain positioning parameters) the one or more other VUEs 615 (e.g., to obtain positioning parameters of VUE 615-*b*, environmental parameters, or any combination thereof).

At 655, RSU 605 my output an indication of the reliability distance. The reliability distance may correspond to a region for providing feedback for the groupcast message. In some cases, RSU 605 may output the indication of the reliability distance based on obtaining the prediction of the future vehicle location of VUE 615-*a* or a future vehicle location of other VUEs 615. In some cases, RSU 605 may output the indication of the reliability distance based on the service type of the V2X system.

In some cases, at 660, RSU 605 may transmit, and VUE 615-*a* may receive, a reliability distance indication. In some cases, RSU 605 may transmit the reliability distance indication via a unicast message dedicated for VUE 615-*a*, a radio resource control (RRC) reconfiguration message, a PC5 RRC message, a PC5 sidelink message, an RRC message via a Uu communication link, or any combination thereof. In some cases, VUE 615-*a* may receive the reliability distance indication as part of an ADAS map enhancement. In some cases, the reliability distance indication may include an array of pairwise values of NACK distance and interaction point distance. For example, if the reliability distance is 300 meters and if the interaction point is 500 meters away from VUE 615-*a*, the reliability distance indication may include the array of pairwise values (300, 500). In some cases, the reliability distance indication may include inputs for a formula. For example, the formula for the reliability distance may be $$N = \left(\frac{D}{2}\right) \times A + L,$$

where N may be the reliability distance (e.g., distance-based groupcast feedback (NACK) distance), D may be the interaction region size (e.g., the diametric size of a region for reliable groupcast), L may be the VUE 615-*a* distance (e.g., the distance between VUE 615-*a* and the interaction point), and A may be a NACK range adjustment multiplier. In some cases, the formula for the reliability distance may also include an indication of an interaction point or a center of an interaction region, which may include a latitude and longitude of the interaction point. In the case of the reliability distance being determined by the formula, the VUE 615-*a* may receive one or more of the inputs for the formula (e.g., D. L. A. or any combination thereof). In some cases, the reliability distance indication may include enumerated values, such as latitude and longitude micro degree indications, a range value, and a distance from the interaction point.

Whether the reliability indication is based on an array of pairwise values or a formula, VUE 615-*a* may receive the reliability distance indication via one or more application layer, one or more lower-layer information elements, or any combination thereof. The information elements may transmitted as a unicast transmission, such as PC5 dedicated signaling in a PC5-RRC message, or in a PC5 signaling (PC5-S) message. The information elements may also be transmitted using dedicated signaling, such as Uu dedicated signaling in an RRC message.

At 665, VUE 615-*a* may transmit, and other VUEs 615 (e.g., VUE 615-*b*) may receive, the groupcast message. VUE 615-*a* may transmit the groupcast message using a transmit power that corresponds to or is based on the reliability distance, which may correspond to a region for providing feedback for the groupcast message (e.g., a NACK region). For example, VUE 615-*a* may increase the transmit power for a larger reliability distance or decrease the transmit power for a smaller reliability distance.

At 670, VUE 615-*a* may monitor for feedback for the groupcast message based on transmitting the groupcast message at 665.

In some cases, at 675, VUE 615-*b* may transmit and VUE 615-*a* may receive, a feedback message related to the groupcast message. In some cases, the feedback message may include maneuver coordination or sensor information related to the V2X system and an interaction point or interaction region within the V2X system.

Figure 7:
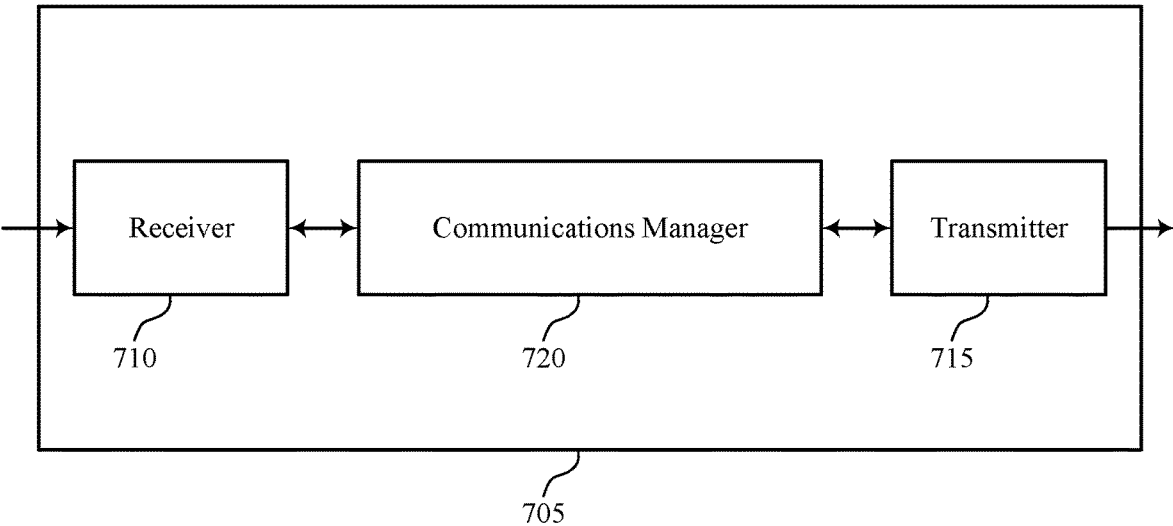
FIGS. 7 and 8 show block diagrams of devices that support dynamic reliability distance for wireless communications in accordance with one or more aspects of the present disclosure.

FIG. 7 shows a block diagram 700 of a device 705 that supports dynamic reliability distance for wireless communications in accordance with one or more aspects of the present disclosure. The device 705 may be an example of aspects of a UE 115 as described herein. The device 705 may include a receiver 710, a transmitter 715, and a communications manager 720. The device 705, or one or more components of the device 705 (e.g., the receiver 710, the transmitter 715, and the communications manager 720), may include at least one processor, which may be coupled with at least one memory, to, individually or collectively, support or enable the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to dynamic reliability distance for wireless communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to dynamic reliability distance for wireless communications). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of dynamic reliability distance for wireless communications as described herein. For example, the communications manager 720, the receiver 710, the transmitter 715, or various combinations or components thereof may be capable of performing one or more of the functions described herein.

In some examples, the communications manager 720, the receiver 710, the transmitter 715, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 720, the receiver 710, the transmitter 715, or various combinations or components thereof may be implemented in code (e.g., as communications management software or firmware) executed by at least one processor. If implemented in code executed by at least one processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication in accordance with examples as disclosed herein. For example, the communications manager 720 is capable of, configured to, or operable to support a means for generating a groupcast message for transmission by the VUE in a V2X system. The communications manager 720 is capable of, configured to, or operable to support a means for transmitting the groupcast message using a transmit power that is based on a reliability distance that corresponds to a region for providing feedback for the groupcast message, where the reliability distance is based on one or more positioning parameters of the VUE and on one or more environmental parameters associated with the V2X system. The communications manager 720 is capable of, configured to, or operable to support a means for monitoring for feedback for the groupcast message based on transmission of the groupcast message.

By including or configuring the communications manager 720 in accordance with examples as described herein, the device 705 (e.g., at least one processor controlling or otherwise coupled with the receiver 710, the transmitter 715, the communications manager 720, or a combination thereof) may support techniques for reduced power consumption by allowing for a relatively smaller region for transmitting a groupcast message and thereby a lower transmission power along with more efficient utilization of communication resources when a VUE is close to an interaction point.

Figure 8:
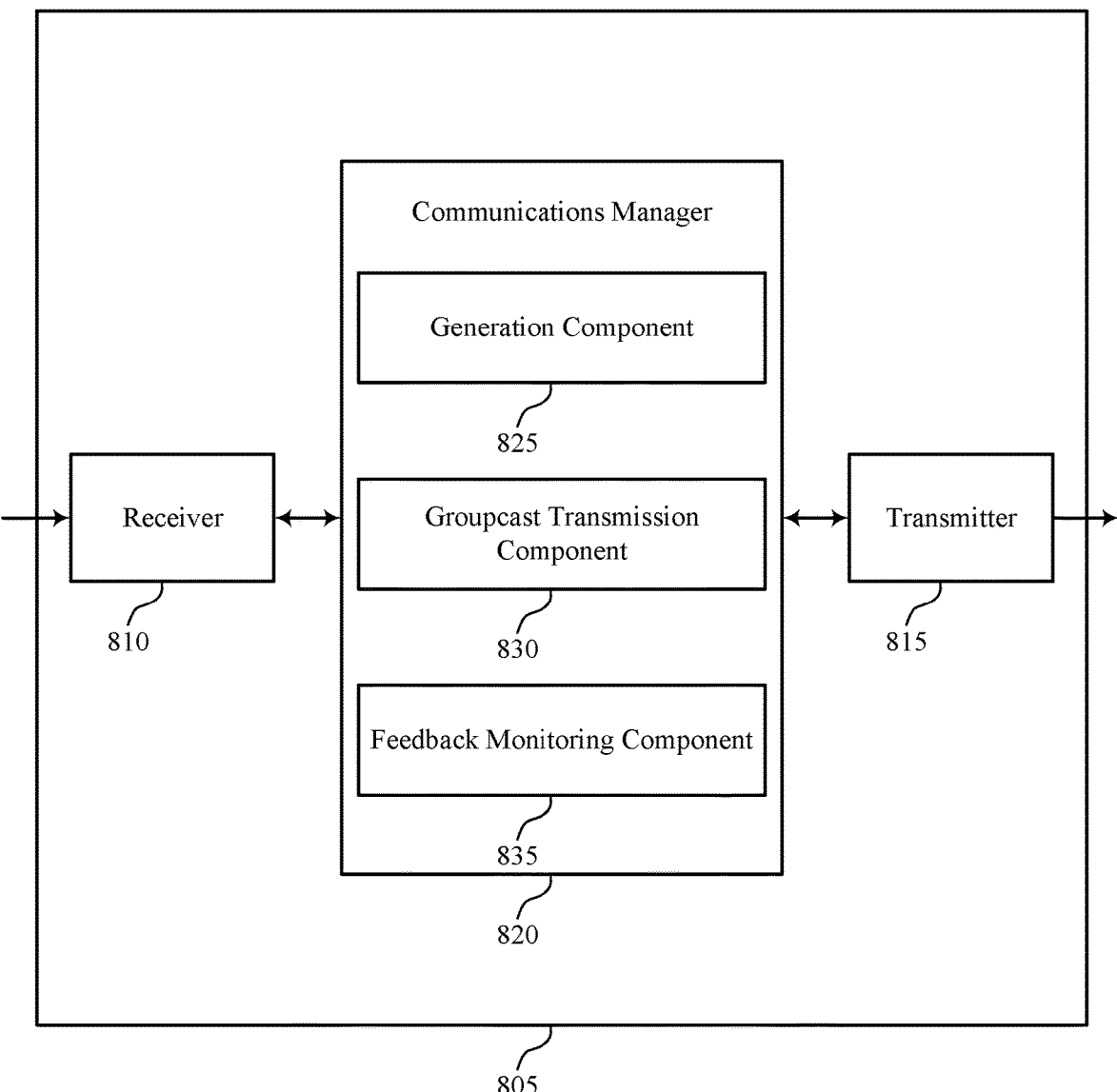

FIG. 8 shows a block diagram 800 of a device 805 that supports dynamic reliability distance for wireless communications in accordance with one or more aspects of the present disclosure. The device 805 may be an example of aspects of a device 705 or a UE 115 as described herein. The device 805 may include a receiver 810, a transmitter 815, and a communications manager 820. The device 805, or one or more components of the device 805 (e.g., the receiver 810, the transmitter 815, and the communications manager 820), may include at least one processor, which may be coupled with at least one memory, to support the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to dynamic reliability distance for wireless communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to dynamic reliability distance for wireless communications). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of dynamic reliability distance for wireless communications as described herein. For example, the communications manager 820 may include a generation component 825, a groupcast transmission component 830, a feedback monitoring component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication in accordance with examples as disclosed herein. The generation component 825 is capable of, configured to, or operable to support a means for generating a groupcast message for transmission by the VUE in a V2X system. The groupcast transmission component 830 is capable of, configured to, or operable to support a means for transmitting the groupcast message using a transmit power that is based on a reliability distance that corresponds to a region for providing feedback for the groupcast message, where the reliability distance is based on one or more positioning parameters of the VUE and on one or more environmental parameters associated with the V2X system.

The feedback monitoring component 835 is capable of, configured to, or operable to support a means for monitoring for feedback for the groupcast message based on transmission of the groupcast message.

Figure 9:
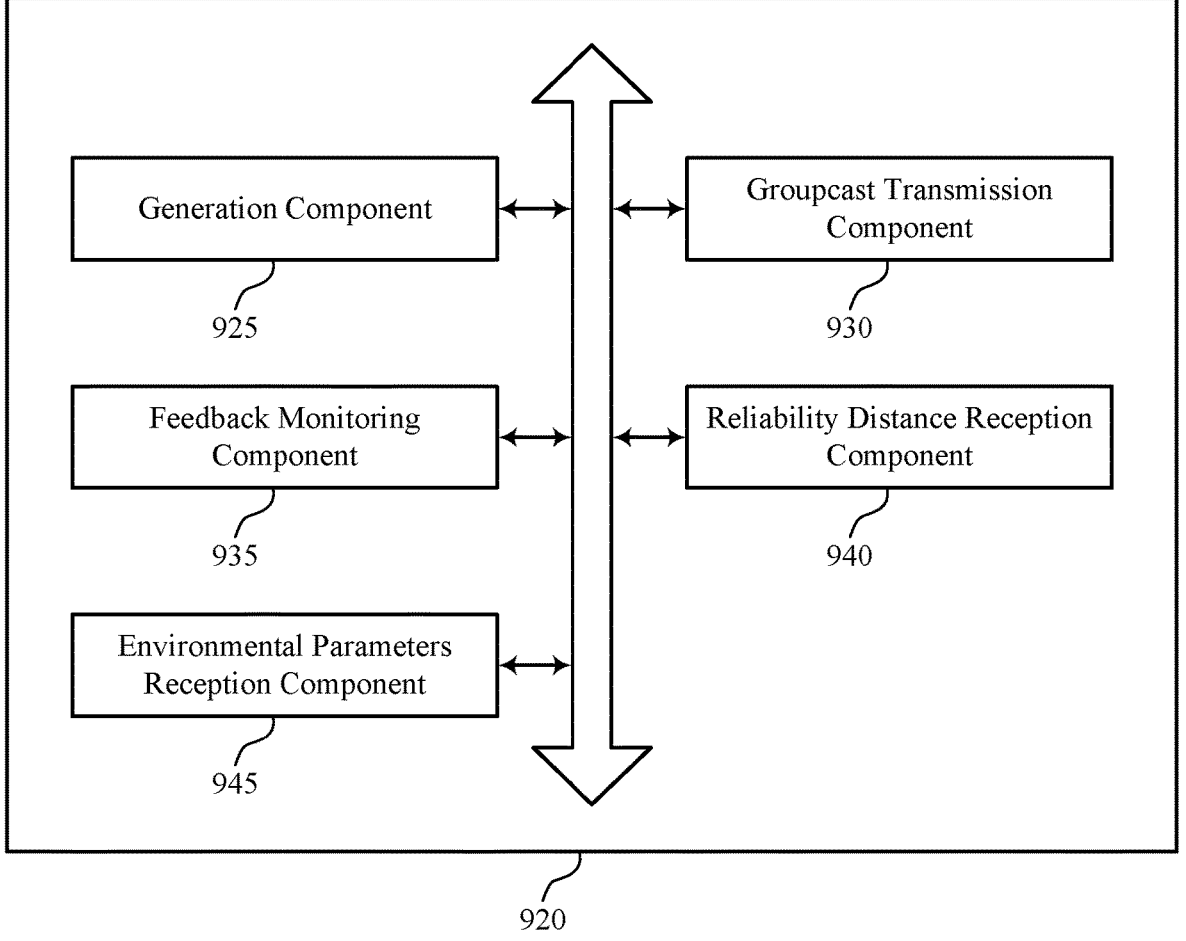
FIG. 9 shows a block diagram of a communications manager that supports dynamic reliability distance for wireless communications in accordance with one or more aspects of the present disclosure.

FIG. 9 shows a block diagram 900 of a communications manager 920 that supports dynamic reliability distance for wireless communications in accordance with one or more aspects of the present disclosure. The communications manager 920 may be an example of aspects of a communications manager 720, a communications manager 820, or both, as described herein. The communications manager 920, or various components thereof, may be an example of means for performing various aspects of dynamic reliability distance for wireless communications as described herein. For example, the communications manager 920 may include a generation component 925, a groupcast transmission component 930, a feedback monitoring component 935, a reliability distance reception component 940, an environmental parameters reception component 945, or any combination thereof. Each of these components, or components or subcomponents thereof (e.g., one or more processors, one or more memories), may communicate, directly or indirectly, with one another (e.g., via one or more buses).

The communications manager 920 may support wireless communication in accordance with examples as disclosed herein. The generation component 925 is capable of, configured to, or operable to support a means for generating a groupcast message for transmission by the VUE in a V2X system. The groupcast transmission component 930 is capable of, configured to, or operable to support a means for transmitting the groupcast message using a transmit power that is based on a reliability distance that corresponds to a region for providing feedback for the groupcast message, where the reliability distance is based on one or more positioning parameters of the VUE and on one or more environmental parameters associated with the V2X system. The feedback monitoring component 935 is capable of, configured to, or operable to support a means for monitoring for feedback for the groupcast message based on transmission of the groupcast message.

In some examples, to support transmitting the groupcast message, the groupcast transmission component 930 is capable of, configured to, or operable to support a means for transmitting the groupcast message using the transmit power, where the transmit power is based on a location of an interaction zone associated with the groupcast message and on an interaction region corresponding to the location of the interaction zone, where the reliability distance is based on the location of the interaction zone associated with the groupcast message and on the interaction region corresponding to the location of the interaction zone.

In some examples, to support transmitting the groupcast message, the groupcast transmission component 930 is capable of, configured to, or operable to support a means for transmitting the groupcast message using the transmit power, where the transmit power is based on a vehicle location of the VUE relative to the interaction zone associated with the groupcast message, where the one or more positioning parameters of the VUE include the vehicle location of the VUE.

In some examples, to support transmitting the groupcast message, the groupcast transmission component 930 is capable of, configured to, or operable to support a means for transmitting the groupcast message based on the reliability distance, where the reliability distance is based on one or more static road parameters, one or more dynamic road parameters, one or more time specific road parameters, a sight stopping distance, or any combination thereof.

In some examples, to support transmitting the groupcast message, the groupcast transmission component 930 is capable of, configured to, or operable to support a means for transmitting the groupcast message based on the reliability distance, where the reliability distance is based on a location of the VUE, a motion state of the VUE, or any combination thereof.

In some examples, to support transmitting the groupcast message, the groupcast transmission component 930 is capable of, configured to, or operable to support a means for transmitting the groupcast message based on the reliability distance, where the reliability distance is based on information from a third party mapping service.

In some examples, the reliability distance reception component 940 is capable of, configured to, or operable to support a means for receiving an indication of the reliability distance via a unicast message dedicated for the VUE, a radio resource control reconfiguration message, a PC5 radio resource control message, a PC5 sidelink message, a radio resource control message via a Uu communication link, or any combination thereof.

In some examples, the indication of the reliability distance is received from a RSU.

In some examples, the indication of the reliability distance is received as part of an ADAS map enhancement.

In some examples, the environmental parameters reception component 945 is capable of, configured to, or operable to support a means for receiving an indication of the one or more environmental parameters associated with the V2X system, where the reliability distance is based on the indication of the one or more environmental parameters associated with the V2X system and on the one or more positioning parameters of the VUE.

In some examples, to support transmitting the groupcast message, the groupcast transmission component 930 is capable of, configured to, or operable to support a means for transmitting the groupcast message based on the reliability distance, where the reliability distance is based on a service type of the VUE, the service type of the groupcast message, the service type of one or more UEs of the V2X system, or any combination thereof.

In some examples, the service type includes maneuver sharing, sensor sharing, collective perception, or any combination thereof.

Figure 10:
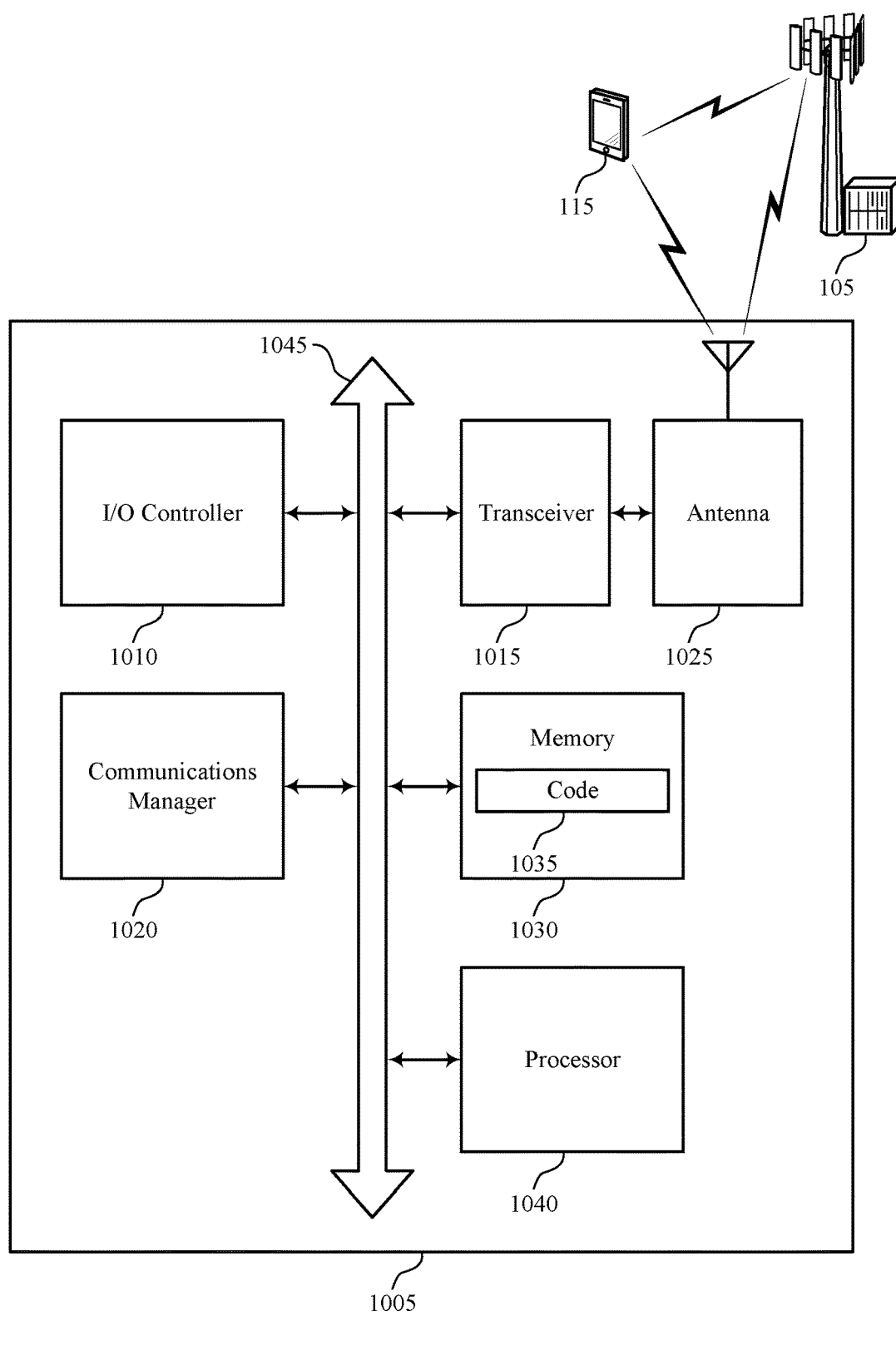
FIG. 10 shows a diagram of a system including a device that supports dynamic reliability distance for wireless communications in accordance with one or more aspects of the present disclosure.

FIG. 10 shows a diagram of a system 1000 including a device 1005 that supports dynamic reliability distance for wireless communications in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, at least one memory 1030, code 1035, and at least one processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005.

In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of one or more processors, such as the at least one processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The at least one memory 1030 may include random access memory (RAM) and read-only memory (ROM). The at least one memory 1030 may store computer-readable, computer-executable code 1035 including instructions that, when executed by the at least one processor 1040, cause the device 1005 to perform various functions described herein. The code 1035 may be stored in a non-transitory computer-readable medium such as system memory or another type of memory. In some cases, the code 1035 may not be directly executable by the at least one processor 1040 but may cause a computer (e.g., when compiled and executed) to perform functions described herein. In some cases, the at least one memory 1030 may contain, among other things, a basic I/O system (BIOS) which may control basic hardware or software operation such as the interaction with peripheral components or devices.

The at least one processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1040 may be configured to operate a memory array using a memory controller. In some other cases, a memory controller may be integrated into the at least one processor 1040. The at least one processor 1040 may be configured to execute computer-readable instructions stored in a memory (e.g., the at least one memory 1030) to cause the device 1005 to perform various functions (e.g., functions or tasks supporting dynamic reliability distance for wireless communications). For example, the device 1005 or a component of the device 1005 may include at least one processor 1040 and at least one memory 1030 coupled with or to the at least one processor 1040, the at least one processor 1040 and at least one memory 1030 configured to perform various functions described herein. In some examples, the at least one processor 1040 may include multiple processors and the at least one memory 1030 may include multiple memories. One or more of the multiple processors may be coupled with one or more of the multiple memories, which may, individually or collectively, be configured to perform various functions herein. In some examples, the at least one processor 1040 may be a component of a processing system, which may refer to a system (such as a series) of machines, circuitry (including, for example, one or both of processor circuitry (which may include the at least one processor 1040) and memory circuitry (which may include the at least one memory 1030)), or components, that receives or obtains inputs and processes the inputs to produce, generate, or obtain a set of outputs. The processing system may be configured to perform one or more of the functions described herein. As such, the at least one processor 1040 or a processing system including the at least one processor 1040 may be configured to, configurable to, or operable to cause the device 1005 to perform one or more of the functions described herein. Further, as described herein, being "configured to," being "configurable to," and being "operable to" may be used interchangeably and may be associated with a capability, when executing code stored in the at least one memory 1030 or otherwise, to perform one or more of the functions described herein.

The communications manager 1020 may support wireless communication in accordance with examples as disclosed herein. For example, the communications manager 1020 is capable of, configured to, or operable to support a means for generating a groupcast message for transmission by the VUE in a V2X system. The communications manager 1020 is capable of, configured to, or operable to support a means for transmitting the groupcast message using a transmit power that is based on a reliability distance that corresponds to a region for providing feedback for the groupcast message, where the reliability distance is based on one or more positioning parameters of the VUE and on one or more environmental parameters associated with the V2X system. The communications manager 1020 is capable of, configured to, or operable to support a means for monitoring for feedback for the groupcast message based on transmission of the groupcast message.

By including or configuring the communications manager 1020 in accordance with examples as described herein, the device 1005 may support techniques for reduced power consumption by allowing for a relatively smaller region for transmitting a groupcast message and thereby a lower transmission power along with more efficient utilization of communication resources when a VUE is close to an interaction point.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the at least one processor 1040, the at least one memory 1030, the code 1035, or any combination thereof. For example, the code 1035 may include instructions executable by the at least one processor 1040 to cause the device 1005 to perform various aspects of dynamic reliability distance for wireless communications as described herein, or the at least one processor

1040 and the at least one memory 1030 may be otherwise configured to, individually or collectively, perform or support such operations.

Figure 11:
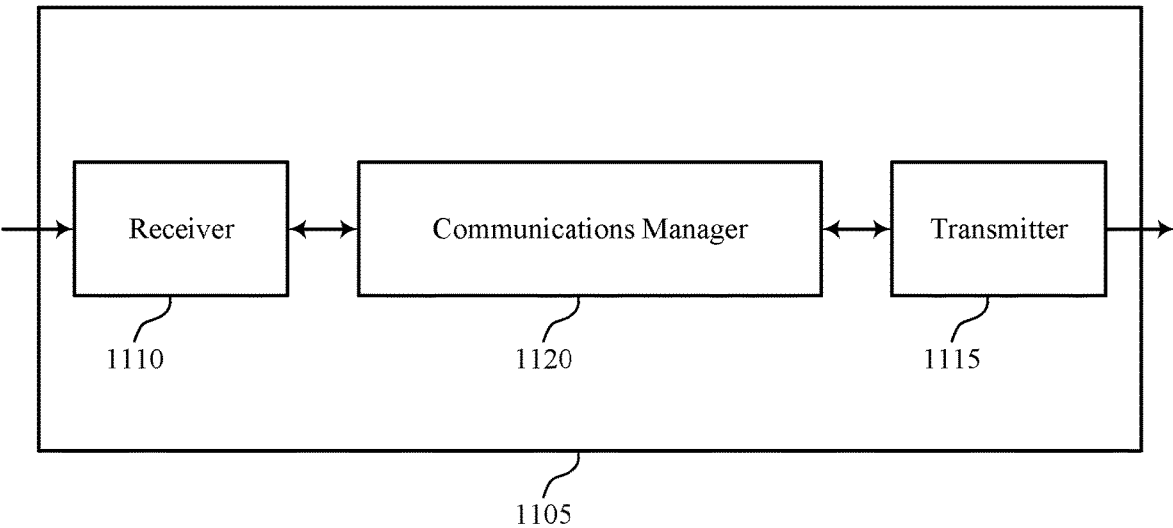
FIGS. 11 and 12 show block diagrams of devices that support dynamic reliability distance for wireless communications in accordance with one or more aspects of the present disclosure.

FIG. 11 shows a block diagram 1100 of a device 1105 that supports dynamic reliability distance for wireless communications in accordance with one or more aspects of the present disclosure. The device 1105 may be an example of aspects of a network entity 105 as described herein. The device 1105 may include a receiver 1110, a transmitter 1115, and a communications manager 1120. The device 1105, or one or more components of the device 1105 (e.g., the receiver 1110, the transmitter 1115, and the communications manager 1120), may include at least one processor, which may be coupled with at least one memory, to, individually or collectively, support or enable the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of dynamic reliability distance for wireless communications as described herein. For example, the communications manager 1120, the receiver 1110, the transmitter 1115, or various combinations or components thereof may be capable of performing one or more of the functions described herein.

In some examples, the communications manager 1120, the receiver 1110, the transmitter 1115, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1120, the receiver 1110, the transmitter 1115, or various combinations or components thereof may be implemented in code (e.g., as communications management software or firmware) executed by at least one processor. If implemented in code executed by at least one processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication in accordance with examples as disclosed herein. For example, the communications manager 1120 is capable of, configured to, or operable to support a means for obtaining one or more positioning parameters for a VUE within a V2X system. The communications manager 1120 is capable of, configured to, or operable to support a means for obtaining one or more environmental parameters associated with the V2X system. The communications manager 1120 is capable of, configured to, or operable to support a means for outputting an indication of a reliability distance that corresponds to a region for providing feedback for a groupcast message, where the reliability distance is based on the one or more positioning parameters of the VUE and the one or more environmental parameters associated with the V2X system.

By including or configuring the communications manager 1120 in accordance with examples as described herein, the device 1105 (e.g., at least one processor controlling or otherwise coupled with the receiver 1110, the transmitter 1115, the communications manager 1120, or a combination thereof) may support techniques for more efficient utilization of communication resources by allowing for a relatively smaller region for transmitting a groupcast message along when a VUE is close to an interaction point.

Figure 12:
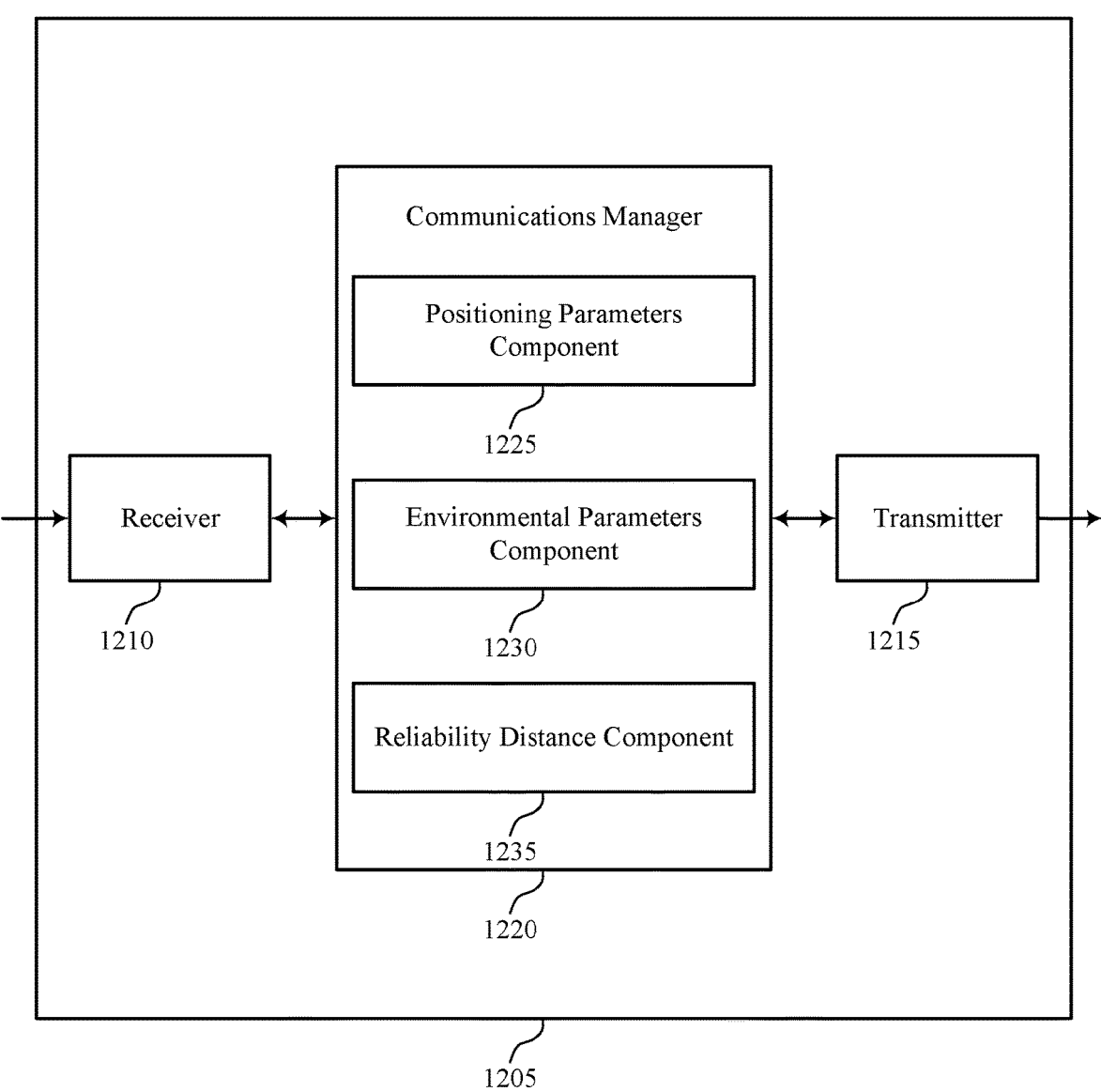

FIG. 12 shows a block diagram 1200 of a device 1205 that supports dynamic reliability distance for wireless communications in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205, or one or more components of the device 1205 (e.g., the receiver 1210, the transmitter 1215, and the communications manager 1220), may include at least one processor, which may be coupled with at least one memory, to support the described techniques. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of dynamic reliability distance for wireless communications as described herein. For example, the communications manager 1220 may include a positioning parameters component 1225, an environmental parameters component 1230, a reliability distance component 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication in accordance with examples as disclosed herein. The positioning parameters component 1225 is capable of, configured to, or operable to support a means for obtaining one or more positioning parameters for a VUE within a V2X system. The environmental parameters component 1230 is capable of, configured to, or operable to support a means for obtaining one or more environmental parameters associated with the V2X system. The reliability distance component 1235 is capable of, configured to, or operable to support a means for outputting an indication of a reliability distance that corresponds to a region for providing feedback for a groupcast message, where the reliability distance is based on the one or more positioning parameters of the VUE and the one or more environmental parameters associated with the V2X system.

Figure 13:
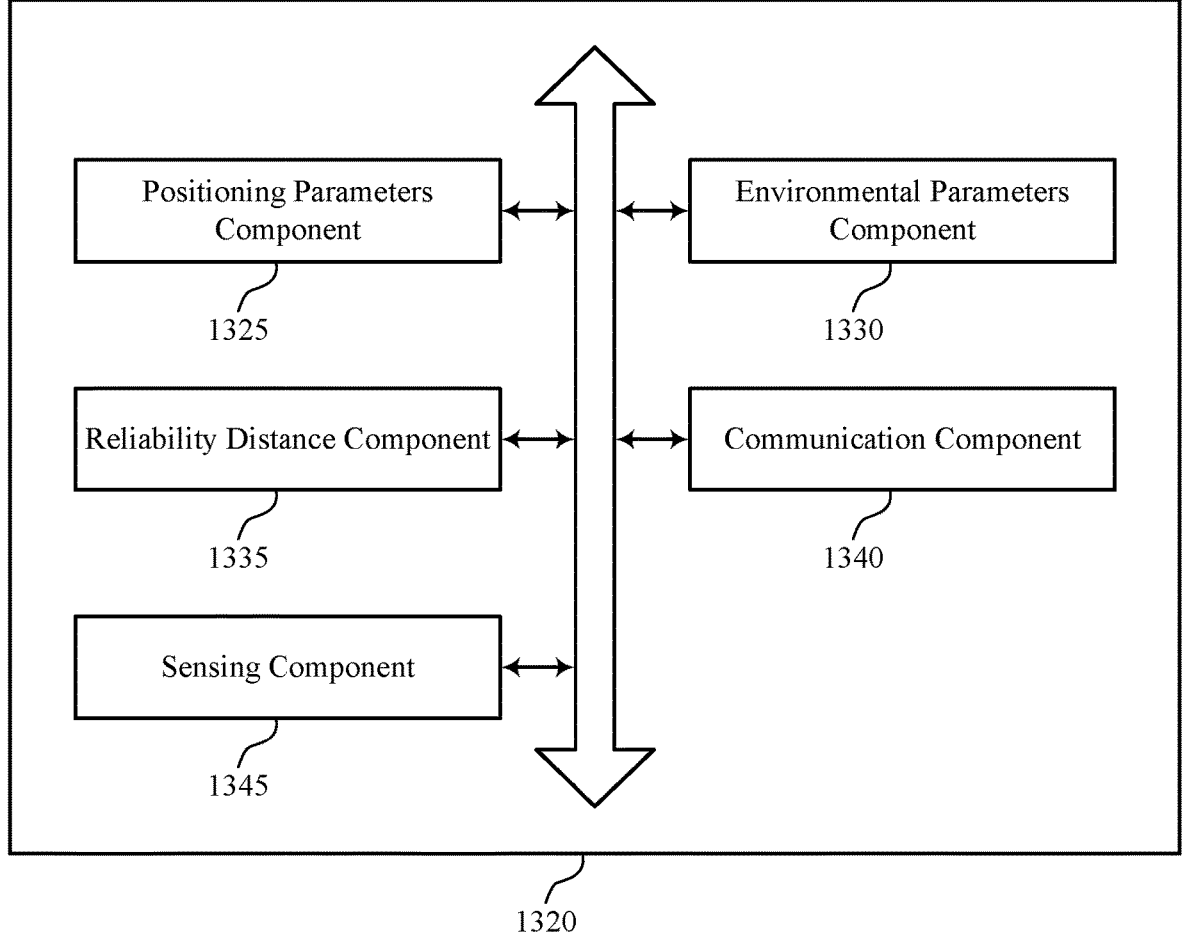
FIG. 13 shows a block diagram of a communications manager that supports dynamic reliability distance for wireless communications in accordance with one or more aspects of the present disclosure.

FIG. 13 shows a block diagram 1300 of a communications manager 1320 that supports dynamic reliability distance for wireless communications in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of dynamic reliability distance for wireless communications as described herein. For example, the communications manager 1320 may include a positioning parameters component 1325, an environmental parameters component 1330, a reliability distance component 1335, a communication component 1340, a sensing component 1345, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communication in accordance with examples as disclosed herein. The positioning parameters component 1325 is capable of, configured to, or operable to support a means for obtaining one or more positioning parameters for a VUE within a V2X system. The environmental parameters component 1330 is capable of, configured to, or operable to support a means for obtaining one or more environmental parameters associated with the V2X system. The reliability distance component 1335 is capable of, configured to, or operable to support a means for outputting an indication of a reliability distance that corresponds to a region for providing feedback for a groupcast message, where the reliability distance is based on the one or more positioning parameters of the VUE and the one or more environmental parameters associated with the V2X system.

In some examples, the reliability distance component 1335 is capable of, configured to, or operable to support a means for configuring the reliability distance based on the one or more environmental parameters, a service type of the VUE, and the service type of one or more other UEs of the V2X system.

In some examples, to support obtaining the one or more positioning parameters for the VUE, the positioning parameters component 1325 is capable of, configured to, or operable to support a means for obtaining a current vehicle location of the VUE and a motion state of the VUE.

In some examples, to support outputting the indication of the reliability distance, the reliability distance component 1335 is capable of, configured to, or operable to support a means for predicting a future location of the VUE at a future time, the predicted future location of the VUE based on the current vehicle location of the VUE, the motion state of the VUE, the one or more environmental parameters associated with the V2X system, information associated with the destination of the VUE, historical location information of the VUE, or any combination thereof.

In some examples, to support outputting the indication of the reliability distance, the reliability distance component 1335 is capable of, configured to, or operable to support a means for outputting the indication of the reliability distance based on determining the reliability distance based on obtaining the prediction.

In some examples, to support outputting the indication of the reliability distance, the reliability distance component 1335 is capable of, configured to, or operable to support a means for outputting the indication of the reliability distance based on a service type of the V2X system.

In some examples, to support outputting the indication of the reliability distance, the reliability distance component 1335 is capable of, configured to, or operable to support a means for outputting the indication of the reliability distance to the VUE or the indication of the reliability distance to one or more other UEs associated with the V2X system, or both.

In some examples, the communication component 1340 is capable of, configured to, or operable to support a means for communicating with one or more other UEs within the V2X system to obtain one or more conditions of the V2X system.

In some examples, the sensing component 1345 is capable of, configured to, or operable to support a means for sensing, using one or more sensors, one or more conditions of the V2X system.

In some examples, the communication component 1340 is capable of, configured to, or operable to support a means for communicating with one or more other UEs within the V2X system. In some examples, the reliability distance component 1335 is capable of, configured to, or operable to support a means for configuring the reliability distance based on communicating with the one or more other UEs within the V2X system.

In some examples, the reliability distance is based on an interaction region corresponding to the location of an interaction zone associated with the groupcast message and on an interaction region corresponding to the location of the interaction zone.

In some examples, to support outputting the indication of the reliability distance, the reliability distance component 1335 is capable of, configured to, or operable to support a means for outputting the indication of the reliability distance, where the reliability distance is based on a vehicle location of the VUE relative to the interaction zone.

In some examples, to support outputting the indication of the reliability distance, the reliability distance component 1335 is capable of, configured to, or operable to support a means for outputting the indication of the reliability distance, where the reliability distance is based on one or more static road parameters, one or more dynamic parameters, one or more time-specific parameters, a sight stopping distance, or any combination thereof.

In some examples, to support obtaining the one or more positioning parameters for the VUE, the positioning parameters component 1325 is capable of, configured to, or operable to support a means for obtaining the one or more positioning parameters for the VUE from a third party mapping service.

In some examples, to support outputting the indication of the reliability distance, the reliability distance component 1335 is capable of, configured to, or operable to support a means for outputting the indication of the reliability distance as part of an ADAS map enhancement.

Figure 14:
FIG. 14 shows a diagram of a system including a device that supports dynamic reliability distance for wireless communications in accordance with one or more aspects of the present disclosure.

FIG. 14 shows a diagram of a system 1400 including a device 1405 that supports dynamic reliability distance for wireless communications in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, at least one memory 1425, code 1430, and at least one processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or one or more memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or one or more memory components (e.g., the at least one processor 1435, the at least one memory 1425, or both), may be included in a chip or chip assembly that is installed in the device 1405. In some examples, the transceiver 1410 may be operable to support communications via one or more communications links (e.g., a communication link 125, a backhaul communication link 120, a midhaul communication link 162, a fronthaul communication link 168).

The at least one memory 1425 may include RAM, ROM, or any combination thereof. The at least one memory 1425 may store computer-readable, computer-executable code 1430 including instructions that, when executed by one or more of the at least one processor 1435, cause the device 1405 to perform various functions described herein. The code 1430 may be stored in a non-transitory computer-readable medium such as system memory or another type of memory. In some cases, the code 1430 may not be directly executable by a processor of the at least one processor 1435 but may cause a computer (e.g., when compiled and executed) to perform functions described herein. In some cases, the at least one memory 1425 may contain, among other things, a BIOS which may control basic hardware or software operation such as the interaction with peripheral components or devices. In some examples, the at least one processor 1435 may include multiple processors and the at least one memory 1425 may include multiple memories. One or more of the multiple processors may be coupled with one or more of the multiple memories which may, individually or collectively, be configured to perform various functions herein (for example, as part of a processing system).

The at least one processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1435 may be configured to operate a memory array using a memory controller. In some other cases, a memory controller may be integrated into one or more of the at least one processor 1435. The at least one processor 1435 may be configured to execute computer-readable instructions stored in a memory (e.g., one or more of the at least one memory 1425) to cause the device 1405 to perform various functions (e.g., functions or tasks supporting dynamic reliability distance for wireless communications). For example, the device 1405 or a component of the device 1405 may include at least one processor 1435 and at least one memory 1425 coupled with one or more of the at least one processor 1435, the at least one processor 1435 and the at least one memory 1425 configured to perform various functions described herein. The at least one processor 1435 may be an example of a cloud-computing platform (e.g., one or more physical nodes and supporting software such as operating systems, virtual machines, or container instances) that may host the functions (e.g., by executing code 1430) to perform the functions of the device 1405. The at least one processor 1435 may be any one or more suitable processors capable of executing scripts or instructions of one or more software programs stored in the device 1405 (such as within one or more of the at least one memory 1425). In some examples, the at least one processor 1435 may include multiple processors and the at least one memory 1425 may include multiple memories. One or more of the multiple processors may be coupled with one or more of the multiple memories, which may, individually or collectively, be configured to perform various functions herein. In some examples, the at least one processor 1435 may be a component of a processing system, which may refer to a system (such as a series) of machines, circuitry (including, for example, one or both of processor circuitry (which may include the at least one processor 1435) and memory circuitry (which may include the at least one memory 1425)), or components, that receives or obtains inputs and processes the inputs to produce, generate, or obtain a set of outputs. The processing system may be configured to perform one or more of the functions described herein. As such, the at least one processor 1435 or a processing system including the at least one processor 1435 may be configured to, configurable to, or operable to cause the device 1405 to perform one or more of the functions described herein. Further, as described herein, being "configured to," being "configurable to," and being "operable to" may be used interchangeably and may be associated with a capability, when executing code stored in the at least one memory 1425 or otherwise, to perform one or more of the functions described herein.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the at least one memory 1425, the code 1430, and the at least one processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communication in accordance with examples as disclosed herein. For example, the communications manager 1420 is capable of, configured to, or operable to support a means for obtaining one or more positioning parameters for a VUE within a V2X system. The communications manager 1420 is capable of, configured to, or operable to support a means for obtaining one or more environmental parameters associated with the V2X system. The communications manager 1420 is capable of, configured to, or operable to support a means for outputting an indication of a reliability distance that corresponds to a region for providing feedback for a groupcast message, where the reliability distance is based on the one or more positioning parameters of the VUE and the one or more environmental parameters associated with the V2X system.

By including or configuring the communications manager 1420 in accordance with examples as described herein, the device 1405 may support techniques for more efficient utilization of communication resources by allowing for a relatively smaller region for transmitting a groupcast message along when a VUE is close to an interaction point.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, one or more of the at least one processor 1435, one or more of the at least one memory 1425, the code 1430, or any combination thereof (for example, by a processing system including at least a portion of the at least one processor 1435, the at least one memory 1425, the code 1430, or any combination thereof). For example, the code 1430 may include instructions executable by one or more of the at least one processor 1435 to cause the device 1405 to perform various aspects of dynamic reliability distance for wireless communications as described herein, or the at least one processor 1435 and the at least one memory 1425 may be otherwise configured to, individually or collectively, perform or support such operations.

FIG. 15 shows a flowchart illustrating a method 1500 that supports dynamic reliability distance for wireless communications in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include generating a groupcast message for transmission by the VUE in a V2X system. The operations of block 1505 may be performed in accordance with examples as disclosed herein. In some examples, aspects of the operations of 1505 may be performed by a generation component 925 as described with reference to FIG. 9.

At 1510, the method may include transmitting the groupcast message using a transmit power that is based on a reliability distance that corresponds to a region for providing feedback for the groupcast message, where the reliability distance is based on one or more positioning parameters of the VUE and on one or more environmental parameters associated with the V2X system. The operations of block 1510 may be performed in accordance with examples as disclosed herein. In some examples, aspects of the operations of 1510 may be performed by a groupcast transmission component 930 as described with reference to FIG. 9.

At 1515, the method may include monitoring for feedback for the groupcast message based on transmission of the groupcast message. The operations of block 1515 may be performed in accordance with examples as disclosed herein. In some examples, aspects of the operations of 1515 may be performed by a feedback monitoring component 935 as described with reference to FIG. 9.

FIG. 16 shows a flowchart illustrating a method 1600 that supports dynamic reliability distance for wireless communications in accordance with aspects of the present disclosure. The operations of the method 1600 may be implemented by a network entity or its components as described herein. For example, the operations of the method 1600 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1605, the method may include obtaining one or more positioning parameters for a VUE within a V2X system. The operations of block 1605 may be performed in accordance with examples as disclosed herein. In some examples, aspects of the operations of 1605 may be performed by a positioning parameters component 1325 as described with reference to FIG. 13.

At 1610, the method may include obtaining one or more environmental parameters associated with the V2X system. The operations of block 1610 may be performed in accordance with examples as disclosed herein. In some examples, aspects of the operations of 1610 may be performed by an environmental parameters component 1330 as described with reference to FIG. 13.

At 1615, the method may include outputting an indication of a reliability distance that corresponds to a region for providing feedback for a groupcast message, where the reliability distance is based on the one or more positioning parameters of the VUE and the one or more environmental parameters associated with the V2X system. The operations of block 1615 may be performed in accordance with examples as disclosed herein. In some examples, aspects of the operations of 1615 may be performed by a reliability distance component 1335 as described with reference to FIG. 13.

The following provides an overview of aspects of the present disclosure:

Aspect 1: A method for wireless communication by a VUE, comprising: generating a groupcast message for transmission by the VUE in a V2X system; transmitting the groupcast message using a transmit power that is based at least in part on a reliability distance that corresponds to a region for providing feedback for the groupcast message, wherein the reliability distance is based at least in part on one or more positioning parameters of the VUE and on one or more environmental parameters associated with the V2X system; and monitoring for feedback for the groupcast message based at least in part on transmission of the groupcast message.

Aspect 2: The method of aspect 1, wherein transmitting the groupcast message comprises: transmitting the groupcast message using the transmit power, wherein the transmit power is based at least in part on a location of an interaction zone associated with the groupcast message and on an interaction region corresponding to the location of the interaction zone, wherein the reliability distance is based at least in part on the location of the interaction zone associated with the groupcast message and on the interaction region corresponding to the location of the interaction zone.

Aspect 3: The method of aspect 2, wherein transmitting the groupcast message comprises: transmitting the groupcast message using the transmit power, wherein the transmit power is based at least in part on a vehicle location of the VUE relative to the interaction zone associated with the groupcast message, wherein the one or more positioning parameters of the VUE comprise the vehicle location of the VUE.

Aspect 4: The method of any of aspects 1 through 3, wherein transmitting the groupcast message comprises: transmitting the groupcast message based at least in part on the reliability distance, wherein the reliability distance is based at least in part on one or more static road parameters, one or more dynamic road parameters, one or more time specific road parameters, a sight stopping distance, or any combination thereof.

Aspect 5: The method of any of aspects 1 through 4, wherein transmitting the groupcast message comprises: transmitting the groupcast message based at least in part on the reliability distance, wherein the reliability distance is based at least in part on a location of the VUE, a motion state of the VUE, or any combination thereof.

Aspect 6: The method of aspect 5, wherein transmitting the groupcast message comprises: transmitting the groupcast message based at least in part on the reliability distance, wherein the reliability distance is based at least in part on information from a third party mapping service.

Aspect 7: The method of any of aspects 1 through 6, further comprising: receiving an indication of the reliability distance via a unicast message dedicated for the VUE, a radio resource control reconfiguration message, a PC5 radio resource control message, a PC5 sidelink message, a radio resource control message via a Uu communication link, or any combination thereof.

Aspect 8: The method of aspect 7, wherein the indication of the reliability distance is received from a roadside unit (RSU).

Aspect 9: The method of any of aspects 7 through 8, wherein the indication of the reliability distance is received as part of an advanced driver assistance systems (ADAS) map enhancement.

Aspect 10: The method of any of aspects 1 through 9, further comprising: receiving an indication of the one or more environmental parameters associated with the V2X system, wherein the reliability distance is based at least in part on the indication of the one or more environmental parameters associated with the V2X system and on the one or more positioning parameters of the VUE.

Aspect 11: The method of any of aspects 1 through 10, wherein transmitting the groupcast message further comprises: transmitting the groupcast message based at least in part on the reliability distance, wherein the reliability distance is based at least in part on a service type of the VUE, the service type of the groupcast message, the service type of one or more UEs of the V2X system, or any combination thereof.

Aspect 12: The method of aspect 11, wherein the service type comprises maneuver sharing, sensor sharing, collective perception, or any combination thereof.

Aspect 13: A method for wireless communication by a network entity, comprising: obtaining one or more positioning parameters for a VUE within a vehicle to everything (V2X) system; and obtaining one or more environmental parameters associated with the V2X system; outputting an indication of a reliability distance that corresponds to a region for providing feedback for a groupcast message, wherein the reliability distance is based at least in part on the one or more positioning parameters of the VUE and the one or more environmental parameters associated with the V2X system.

Aspect 14: The method of aspect 13, further comprising: configuring the reliability distance based at least in part on the one or more environmental parameters, a service type of the VUE, and the service type of one or more other UEs of the V2X system.

Aspect 15: The method of any of aspects 13 through 14, wherein obtaining the one or more positioning parameters for the VUE further comprises: obtaining a current vehicle location of the VUE and a motion state of the VUE.

Aspect 16: The method of any of aspects 13 through 15, wherein outputting the indication of the reliability distance further comprises: predicting a future location of the VUE at a future time, the predicted future location of the VUE based at least in part on a current vehicle location of the VUE, the motion state of the VUE, the one or more environmental parameters associated with the V2X system, information associated with the destination of the VUE, historical location information of the VUE, or any combination thereof.

Aspect 17: The method of aspect 16, wherein outputting the indication of the reliability distance further comprises: outputting the indication of the reliability distance based at least in part on the predicted future location of the VUE.

Aspect 18: The method of aspect 17, wherein outputting the indication of the reliability distance further comprises: outputting the indication of the reliability distance based at least in part on a service type of the groupcast message.

Aspect 19: The method of any of aspects 13 through 18, wherein outputting the indication of the reliability distance further comprises: outputting the indication of the reliability distance to the VUE or the indication of the reliability distance to one or more other UEs associated with the V2X system, or both.

Aspect 20: The method of any of aspects 13 through 19, further comprising: communicating with one or more other UEs within the V2X system to obtain one or more conditions of the V2X system.

Aspect 21: The method of any of aspects 13 through 20, further comprising: sensing, using one or more sensors, one or more conditions of the V2X system.

Aspect 22: The method of any of aspects 13 through 21, further comprising: communicating with one or more other UEs within the V2X system; and configuring the reliability distance based at least in part on communication with the one or more other UEs within the V2X system.

Aspect 23: The method of any of aspects 13 through 22, wherein the reliability distance is based at least in part on an interaction region corresponding to the location of an interaction zone associated with the groupcast message and on an interaction region corresponding to the location of the interaction zone.

Aspect 24: The method of aspect 23, wherein outputting the indication of the reliability distance further comprises: outputting the indication of the reliability distance, wherein the reliability distance is based at least in part on a vehicle location of the VUE relative to the interaction zone.

Aspect 25: The method of any of aspects 13 through 24, wherein outputting the indication of the reliability distance further comprises: outputting the indication of the reliability distance, wherein the reliability distance is based at least in part on one or more static road parameters, one or more dynamic parameters, one or more time-specific parameters, a sight stopping distance, or any combination thereof.

Aspect 26: The method of any of aspects 13 through 25, wherein obtaining the one or more positioning parameters for the VUE further comprises: obtaining the one or more positioning parameters for the VUE from a third party mapping service.

Aspect 27: The method of any of aspects 13 through 26, wherein outputting the indication of the reliability distance further comprises: outputting the indication of the reliability distance as part of an advanced driver assistance systems (ADAS) map enhancement.

Aspect 28: A VUE for wireless communication, comprising one or more memories storing processor-executable code, and one or more processors coupled with the one or more memories and individually or collectively operable to execute the code to cause the VUE to perform a method of any of aspects 1 through 12.

Aspect 29: A VUE for wireless communication, comprising at least one means for performing a method of any of aspects 1 through 12.

Aspect 30: A non-transitory computer-readable medium storing code for wireless communication, the code comprising instructions executable by a processor to perform a method of any of aspects 1 through 12.

Aspect 31: A network entity for wireless communication, comprising one or more memories storing processor-executable code, and one or more processors coupled with the one or more memories and individually or collectively operable to execute the code to cause the network entity to perform a method of any of aspects 13 through 27.

Aspect 32: A network entity for wireless communication, comprising at least one means for performing a method of any of aspects 13 through 27.

Aspect 33: A non-transitory computer-readable medium storing code for wireless communication, the code comprising instructions executable by a processor to perform a method of any of aspects 13 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A vehicle user equipment (UE), comprising:
    one or more memories storing processor-executable code; and
    one or more processors coupled with the one or more memories and individually or collectively operable to execute the code to cause the vehicle UE to:
        generate a groupcast message for transmission by the vehicle UE in a vehicle to everything (V2X) system;
        transmit the groupcast message using a transmit power that is based at least in part on a reliability distance that corresponds to a region for providing feedback for the groupcast message, wherein the reliability distance is based at least in part on one or more positioning parameters of the vehicle UE and on one or more environmental parameters associated with the V2X system; and
        monitor for feedback for the groupcast message based at least in part on transmission of the groupcast message.

2. The vehicle UE of claim 1, wherein, to transmit the groupcast message, the one or more processors are individually or collectively operable to execute the code to cause the vehicle UE to:
    transmit the groupcast message using the transmit power, wherein the transmit power is based at least in part on a location of an interaction zone associated with the groupcast message and on an interaction region corresponding to the location of the interaction zone, wherein the reliability distance is based at least in part on the location of the interaction zone associated with the groupcast message and on the interaction region corresponding to the location of the interaction zone.

3. The vehicle UE of claim 2, wherein, to transmit the groupcast message, the one or more processors are individually or collectively operable to execute the code to cause the vehicle UE to:
    transmit the groupcast message using the transmit power, wherein the transmit power is based at least in part on a vehicle location of the vehicle UE relative to the interaction zone associated with the groupcast message, wherein the one or more positioning parameters of the vehicle UE comprise the vehicle location of the vehicle UE.

4. The vehicle UE of claim 1, wherein, to transmit the groupcast message, the one or more processors are individually or collectively operable to execute the code to cause the vehicle UE to:
    transmit the groupcast message based at least in part on the reliability distance, wherein the reliability distance is based at least in part on one or more static road parameters, one or more dynamic road parameters, one or more time specific road parameters, a sight stopping distance, or any combination thereof.

5. The vehicle UE of claim 1, wherein, to transmit the groupcast message, the one or more processors are individually or collectively operable to execute the code to cause the vehicle UE to:
    transmit the groupcast message based at least in part on the reliability distance, wherein the reliability distance is based at least in part on a location of the vehicle UE, a motion state of the vehicle UE, or any combination thereof.

6. The vehicle UE of claim 5, wherein, to transmit the groupcast message, the one or more processors are individually or collectively operable to execute the code to cause the vehicle UE to:
    transmit the groupcast message based at least in part on the reliability distance, wherein the reliability distance is based at least in part on information from a third party mapping service.

7. The vehicle UE of claim 1, wherein the one or more processors are individually or collectively further operable to execute the code to cause the vehicle UE to:
    receive an indication of the reliability distance via a unicast message dedicated for the vehicle UE, a radio resource control reconfiguration message, a PC5 radio resource control message, a PC5 sidelink message, a radio resource control message via a Uu communication link, or any combination thereof.

8. The vehicle UE of claim 7, wherein the indication of the reliability distance is received from a roadside unit (RSU).

9. The vehicle UE of claim 7, wherein the indication of the reliability distance is received as part of an advanced driver assistance systems (ADAS) map enhancement.

10. The vehicle UE of claim 1, wherein the one or more processors are individually or collectively further operable to execute the code to cause the vehicle UE to:

receive an indication of the one or more environmental parameters associated with the V2X system, wherein the reliability distance is based at least in part on the indication of the one or more environmental parameters associated with the V2X system and on the one or more positioning parameters of the vehicle UE.

11. The vehicle UE of claim 1, wherein, to transmit the groupcast message, the one or more processors are individually or collectively further operable to execute the code to cause the vehicle UE to:

transmit the groupcast message based at least in part on the reliability distance, wherein the reliability distance is based at least in part on a service type of the vehicle UE, the service type of the groupcast message, the service type of one or more UEs of the V2X system, or any combination thereof.

12. The vehicle UE of claim 11, wherein the service type comprises maneuver sharing, sensor sharing, collective perception, or any combination thereof.

13. A network entity, comprising:

one or more memories storing processor-executable code; and one or more processors coupled with the one or more memories and individually or collectively operable to execute the code to cause the network entity to:

obtain one or more positioning parameters for a vehicle user equipment (UE) within a vehicle to everything (V2X) system;

obtain one or more environmental parameters associated with the V2X system; and output an indication of a reliability distance that corresponds to a region for providing feedback for a groupcast message, wherein the reliability distance is based at least in part on the one or more positioning parameters of the vehicle UE and the one or more environmental parameters associated with the V2X system.

14. The network entity of claim 13, wherein the one or more processors are individually or collectively further operable to execute the code to cause the network entity to:

configure the reliability distance based at least in part on the one or more environmental parameters, a service type of the vehicle UE, and the service type of one or more other UEs of the V2X system.

15. The network entity of claim 13, wherein, to obtain the one or more positioning parameters for the vehicle UE, the one or more processors are individually or collectively further operable to execute the code to cause the network entity to:

obtain a current vehicle location of the vehicle UE and a motion state of the vehicle UE.

16. The network entity of claim 13, wherein, to output the indication of the reliability distance, the one or more processors are individually or collectively further operable to execute the code to cause the network entity to:

predict a future location of the vehicle UE at a future time, the predicted future location of the vehicle UE based at least in part on a current vehicle location of the vehicle UE, a motion state of the vehicle UE, the one or more environmental parameters associated with the V2X system, information associated with a destination of the vehicle UE, historical location information of the vehicle UE, or any combination thereof.

17. The network entity of claim 16, wherein, to output the indication of the reliability distance, the one or more processors are individually or collectively further operable to execute the code to cause the network entity to:

output the indication of the reliability distance based at least in part on the predicted future location of the vehicle UE.

18. The network entity of claim 17, wherein, to output the indication of the reliability distance, the one or more processors are individually or collectively further operable to execute the code to cause the network entity to:

output the indication of the reliability distance based at least in part on a service type of the groupcast message.

19. The network entity of claim 13, wherein, to output the indication of the reliability distance, the one or more processors are individually or collectively further operable to execute the code to cause the network entity to:

output the indication of the reliability distance to the vehicle UE or the indication of the reliability distance to one or more other UEs associated with the V2X system, or both.

20. The network entity of claim 13, wherein the one or more processors are individually or collectively further operable to execute the code to cause the network entity to:

communicate with one or more other UEs within the V2X system to obtain one or more conditions of the V2X system.

21. The network entity of claim 13, wherein the one or more processors are individually or collectively further operable to execute the code to cause the network entity to:

sense, using one or more sensors, one or more conditions of the V2X system.

22. The network entity of claim 13, wherein the one or more processors are individually or collectively further operable to execute the code to cause the network entity to:

communicate with one or more other UEs within the V2X system; and configure the reliability distance based at least in part on communication with the one or more other UEs within the V2X system.

23. The network entity of claim 13, wherein the reliability distance is based at least in part on an interaction region corresponding to a location of an interaction zone associated with the groupcast message and on an interaction region corresponding to the location of the interaction zone.

24. The network entity of claim 23, wherein, to output the indication of the reliability distance, the one or more processors are individually or collectively further operable to execute the code to cause the network entity to:

output the indication of the reliability distance, wherein the reliability distance is based at least in part on a vehicle location of the vehicle UE relative to the interaction zone.

25. The network entity of claim 13, wherein, to output the indication of the reliability distance, the one or more processors are individually or collectively further operable to execute the code to cause the network entity to:

output the indication of the reliability distance, wherein the reliability distance is based at least in part on one or more static road parameters, one or more dynamic parameters, one or more time-specific parameters, a sight stopping distance, or any combination thereof.

26. The network entity of claim 13, wherein, to obtain the one or more positioning parameters for the vehicle UE, the one or more processors are individually or collectively further operable to execute the code to cause the network entity to:

obtain the one or more positioning parameters for the vehicle UE from a third party mapping service.

27. The network entity of claim 13, wherein, to output the indication of the reliability distance, the one or more processors are individually or collectively further operable to execute the code to cause the network entity to:

output the indication of the reliability distance as part of an advanced driver assistance systems (ADAS) map enhancement.

28. A method for wireless communication by a vehicle user equipment (UE), comprising:

generating a groupcast message for transmission by the vehicle UE in a vehicle to everything (V2X) system;

transmitting the groupcast message using a transmit power that is based at least in part on a reliability distance that corresponds to a region for providing feedback for the groupcast message, wherein the reliability distance is based at least in part on one or more positioning parameters of the vehicle UE and on one or more environmental parameters associated with the V2X system; and monitoring for feedback for the groupcast message based at least in part on transmission of the groupcast message.

29. The method of claim 28, wherein transmitting the groupcast message comprises:

transmitting the groupcast message using the transmit power, wherein the transmit power is based at least in part on a location of an interaction zone associated with the groupcast message and on an interaction region corresponding to the location of the interaction zone, wherein the reliability distance is based at least in part on the location of the interaction zone associated with the groupcast message and on the interaction region corresponding to the location of the interaction zone.

30. A method for wireless communication by a network entity, comprising:

obtaining one or more positioning parameters for a vehicle user equipment (UE) within a vehicle to everything (V2X) system;

obtaining one or more environmental parameters associated with the V2X system; and outputting an indication of a reliability distance that corresponds to a region for providing feedback for a groupcast message, wherein the reliability distance is based at least in part on the one or more positioning parameters of the vehicle UE and the one or more environmental parameters associated with the V2X system.

* * * * *